(12) United States Patent
Scanlon

(10) Patent No.: US 10,922,880 B2
(45) Date of Patent: Feb. 16, 2021

(54) LADAR AND POSITIONAL AWARENESS SYSTEM AND METHODS USING A LINE AT THE INTERSECTION OF MULTICOLOR PLANES OF LASER LIGHT WITH DETECTOR

(71) Applicant: U.S. Army Research Laboratory ATTN: RDRL-LOC-I, Adelphi, MD (US)

(72) Inventor: Michael V. Scanlon, Laurel, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 363 days.

(21) Appl. No.: 15/913,948

(22) Filed: Mar. 7, 2018

(65) Prior Publication Data

US 2019/0279419 A1    Sep. 12, 2019

(51) Int. Cl.

| | | |
|---|---|---|
| *G06T 17/05* | (2011.01) |
| *G02B 27/09* | (2006.01) |
| *G01S 17/06* | (2006.01) |
| *G01S 17/89* | (2020.01) |
| *G01S 17/933* | (2020.01) |

(52) U.S. Cl.
CPC .............. *G06T 17/05* (2013.01); *G01S 17/06* (2013.01); *G01S 17/89* (2013.01); *G02B 27/0966* (2013.01); *G01S 17/933* (2013.01)

(58) Field of Classification Search
CPC ................ H04N 5/2253; H04N 5/247; H04N 5/232121; G06K 7/1413; G06K 7/10722; G06T 7/73; G06T 7/521; G06T 7/1417
See application file for complete search history.

(56) References Cited

U.S. PATENT DOCUMENTS

| | | | | |
|---|---|---|---|---|
| 2002/0195496 A1* | 12/2002 | Tsikos | .................. | G02B 19/009 235/462.01 |
| 2005/0128542 A1* | 6/2005 | Kim | ..................... | G11B 7/1356 359/15 |
| 2007/0262002 A1* | 11/2007 | Ito | ......................... | B07C 5/3425 209/580 |
| 2010/0171931 A1* | 7/2010 | Kessler | ................ | H04N 9/3132 353/31 |
| 2016/0091647 A1* | 3/2016 | Maeda | ................... | G02B 23/02 347/258 |
| 2019/0219698 A1* | 7/2019 | Hoegele | ................ | G01S 7/4804 |
| 2019/0228195 A1* | 7/2019 | Lozano | ................ | H04N 5/2253 |

* cited by examiner

*Primary Examiner* — Luke D Ratcliffe
(74) *Attorney, Agent, or Firm* — Alan I. Kalb

(57) ABSTRACT

Methods, apparatuses, and systems may provide for the detection of an object at a rotating intersecting plane of light created by synchronously rotating a first plane of light and a second plane of light. A first laser beam of a first color may be projected with a first laser line projector and a second laser beam of a second laser beam of a second color may be projected with a second line projector. Laser planes of the first and second laser beams may be adjusted to create a beam intersection line plane of a third color on an object located at a predetermined intersection range from the first and second laser line projectors. The first and second laser line projectors may be rotated to create a rotating plane of light of the third color on the object.

14 Claims, 20 Drawing Sheets

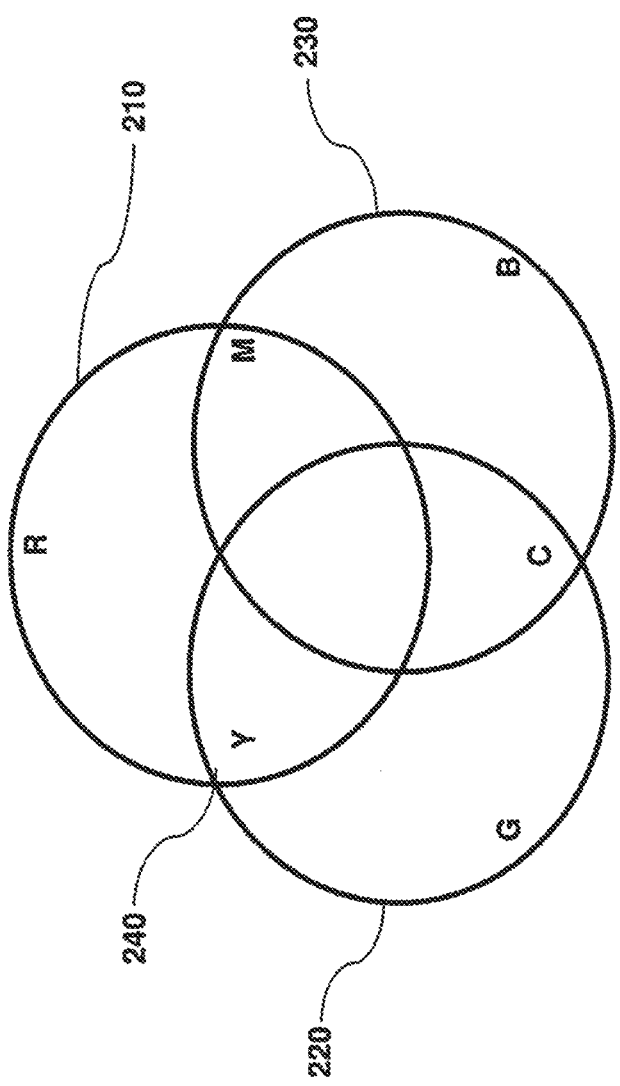
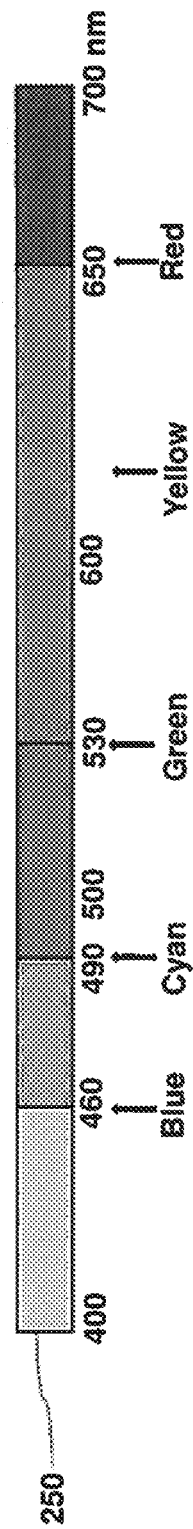
FIG. 2A
FIG. 2B

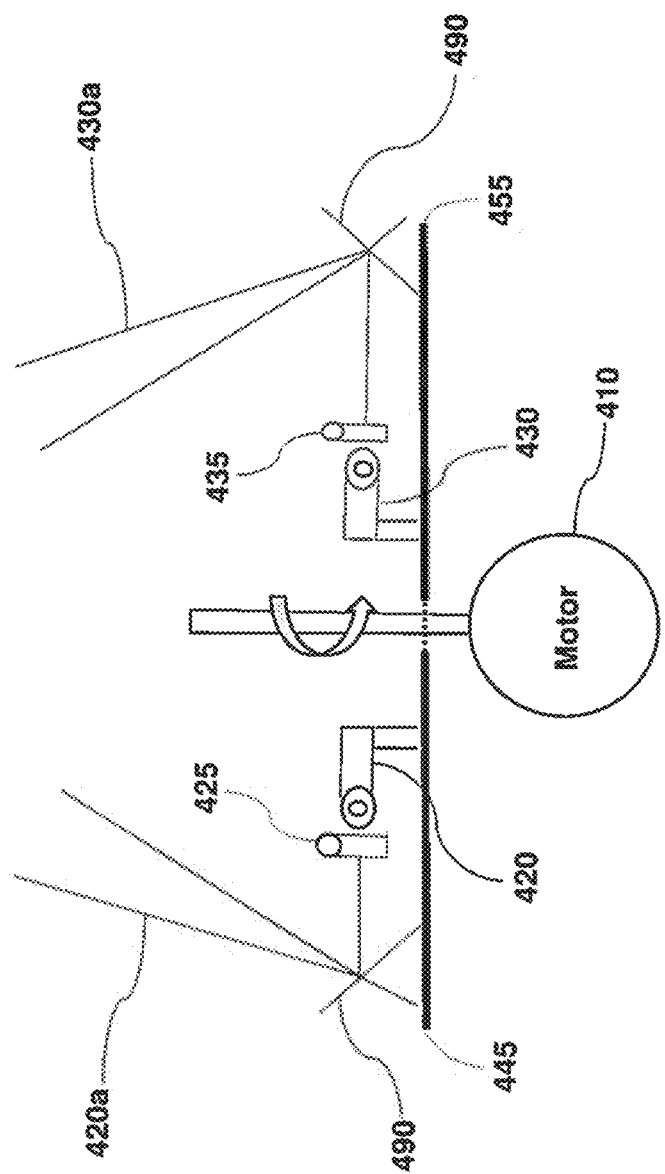

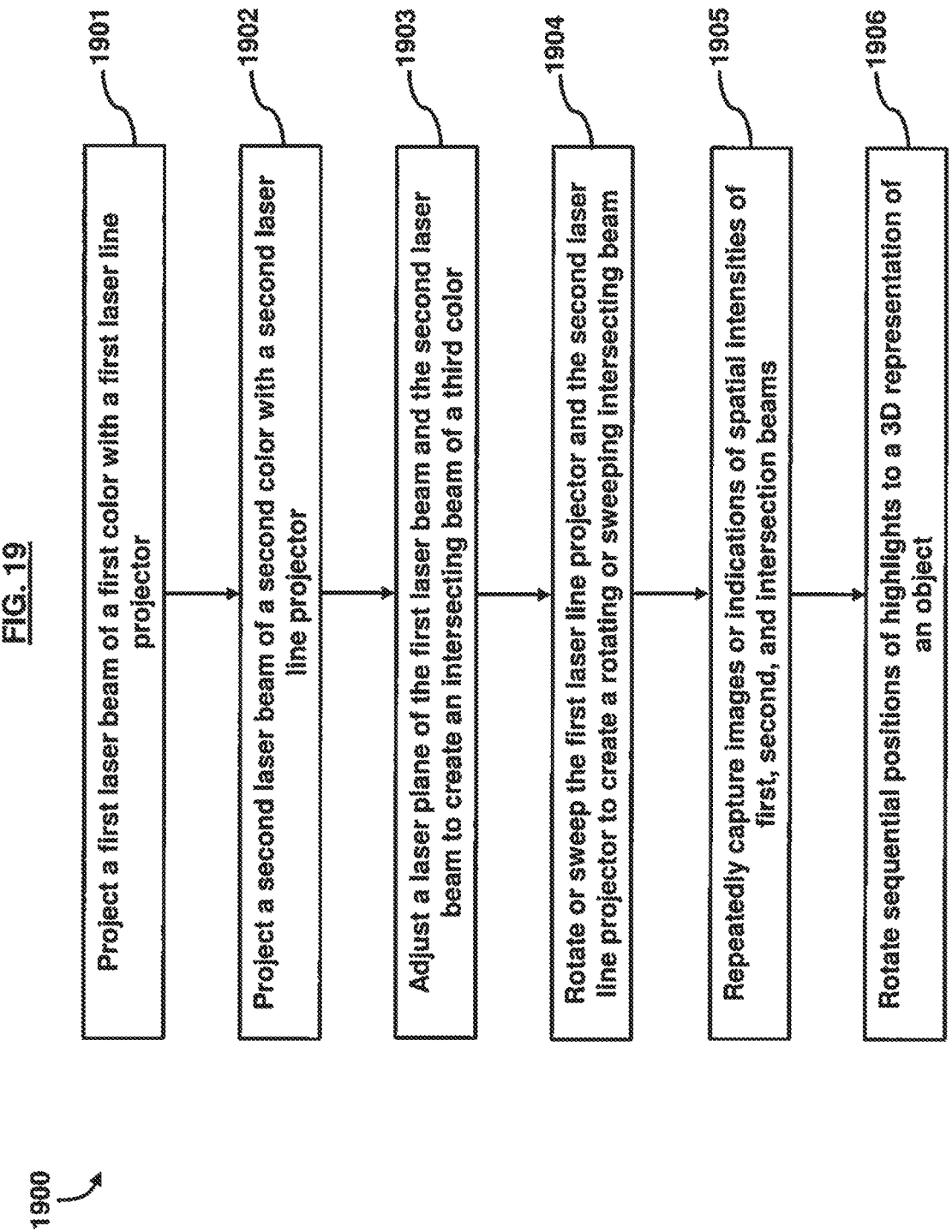

LADAR AND POSITIONAL AWARENESS SYSTEM AND METHODS USING A LINE AT THE INTERSECTION OF MULTICOLOR PLANES OF LASER LIGHT WITH DETECTOR

GOVERNMENT INTEREST

The embodiments described herein may be manufactured, used, and/or licensed by or for the United States Government without the payment of royalties thereon.

BACKGROUND

Technical Field

The embodiments herein generally relate to an object detection system, and more particularly to the detection of an object at a rotating intersecting plane of light created by synchronously rotating a first plane of light and a second plane of light.

SUMMARY

In view of the foregoing, an embodiment herein provides a method comprising projecting a first laser beam of a first color with a first laser line projector; projecting a second laser beam of a second color with a second laser line projector, adjusting a laser plane of the first laser beam and a laser plane of the second laser beam to create a beam intersection line plane of a third color on an object at a predetermined intersection range from the first laser line projector and the second laser line projector; and rotating the first laser line projector and the second laser line projector to create a rotating plane of light of the third color on the object. The method may comprise detecting the first laser beam, the second laser beam, and the beam intersection line plane of the third color with an image or color capture device. The method may comprise capturing the first laser beam; transmitting the first laser beam to a detection area; capturing the second laser beam; and transmitting the second laser beam to the detection area. The third color may comprise an average of a wavelength of the first color of the first laser beam and a wavelength of the second color of the second laser beam. The method may comprise passing through the first color and the second color at the beam intersection line plane; and rejecting colors other than the first color and the second color. The method may comprise adjusting the first laser line projector and the second laser line projector to create the beam intersection line plane of the third color at a distance determined by an angle of the first laser line projector and an angle of the second laser line projector. The method may comprise projecting multiple laser beams simultaneously comprising a plurality of colors to create any of a fourth color and a cross pattern.

Another embodiment provides a system comprising a first laser line projector to project a first laser beam of a first color, a second laser line projector to project a second laser beam of a second color; a laser source adjuster to adjust a laser plane of the first laser beam and a laser plane of the second laser beam to create a beam intersection line plane of a third color on an object at a predetermined intersection range from the first laser line projector and the second laser line projector; an image or color capture device to create a three-dimensional (3D) representation of objects in a field of view of the image or color capture device; and a motor to rotate the first laser line projector and the second laser line projector to create a rotating plane of light of the third color on the object, wherein the motor comprises a shaft, and the first laser line projector and the second laser line projector are mounted on a rail that is perpendicular to the shaft.

The image or color capture device may detect the first laser beam, the second laser beam, and the beam intersection line plane of the third color. The system may comprise a first cylindrical lens to capture the first laser beam and transmit the first laser beam to a detection area; and a second cylindrical lens to capture the second laser beam and transmit the second laser beam to the detection area. The third color may comprise an average of a wavelength of the first color of the first laser beam and a wavelength of the second color of the second laser beam. The system may comprise one or more bandpass filters to pass through the at least first and second colors that form the beam intersection line plane, and reject the out-of-band colors to enhance the beam intersection line plane. The laser source adjuster may adjust the first laser line projector and the second laser line projector to create the beam intersection line plane of the third color at a distance determined by an angle of the first laser line projector and an angle of the second laser line projector. The first color may be red, the second color may be green, and the third color may be yellow.

Another embodiment provides a method for creating a three-dimensional (3D) laser detection and ranging (LADAR) image representation, the method comprising projecting a first laser beam of a first color with a first laser line projector; projecting a second laser beam of a second color with a second laser line projector; creating a beam intersection light wall of a third color on an object at a predetermined intersection range from the first laser line projector and the second laser line projector; determining a relative motion between the light wall of the third color and the object as the object passes through the light wall; repeatedly detecting pixel highlights of the third color based on the relative motion between the light wall of the third color and the object; and creating the 3D LADAR image representation based on the detected pixel highlights. The method may comprise setting the light wall of the third color at a fixed distance from the object. The method may comprise capturing an image or color containing the detected pixel highlights. Each captured image or color may comprise an instantaneously detected pixel highlight location for successive image or color captures. The successive image or color captures may be derived from a movement of either the object or the light wall of the third color. The 3D LADAR image representation may comprise any of a 3D LADAR image point-cloud and a 3D LADAR image cube.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2A and 2B illustrate the mixing of colors in the visible spectrum according to an embodiment;

FIGS. 11A and 11B illustrate an example of adjusting the laser planes according to an embodiment;

FIG. 19 illustrates a flowchart of an example method of creating a circular intersecting object detection beam according to an embodiment.

DETAILED DESCRIPTION

Figure 1:
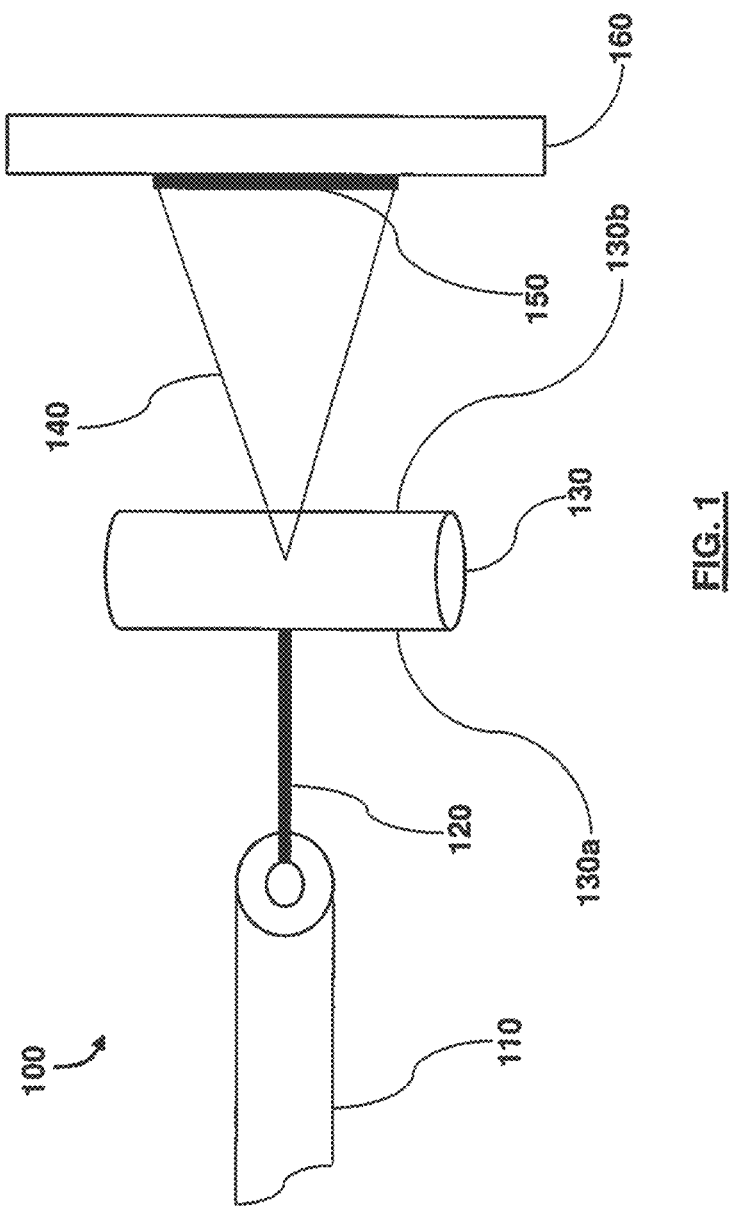
FIG. 1 is an illustration of a laser system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a laser detection and ranging (LADAR) system. Referring now to the drawings, and more particularly to FIGS. 1 through 19, there are shown exemplary embodiments.

FIG. 1 is a schematic view illustrating an exemplary LADAR and positional awareness system 100. A laser source 110 produces a laser beam (or laser light) 120, a ray of light of a small diameter and very limited beam divergence as the light moves further away from the laser source 110. By forcing this beam 120 to go through a first side 130a of a cylindrical glass lens 130, and also preferably through the center of curvature of the cylindrical lens 130, diffraction bends the light and the beam spreads into a plane of laser light 140 radiating radially away from the cylindrical lens 130 at a second side 130b of the cylindrical lens 130 in a direction perpendicular to the height axis of the cylindrical prism. The divergence of this laser fan (or laser plane) 140 may depend on the curvature of the lens 130 (i.e., the diameter), the diameter of the originating laser beam 120, and the wavelength induced diffraction of the laser light. The LADAR system 100 may use two lasers of different colors (discussed below), each with cylindrical lenses of similar size and optical properties, that create two triangular light planes of different colors (or wavelengths).

As illustrated in FIG. 1, laser beam 120, for example, a red laser beam, may be transmitted through cylindrical lens 130. The transmitted laser beam 140 may create a laser fan or plane, shown as a line 150 when projected onto a wall or object 160. As shown, when the cylindrical lens 130 is horizontal, the laser line 140 may project a plane 150 that is vertically oriented. If the cylindrical lens 130 is rotated to the vertical position, then the laser line projection 150 rotates to the horizontal plane.

The diameter of the originating laser beam 120 and the diameter of the cylindrical lens 130 may be varied to change the thickness of the projected light-plane 150 and the angle of dispersion. For a given wavelength of light, a small laser diameter, when passed through a much larger diameter cylinder, will give a smaller divergence angle of the projected light-plane, and project more energy in a smaller angular projection for higher light intensity at longer ranges. Much smaller cylindrical lenses may give larger dispersion angles, and spread the laser energy over a wider area, giving more coverage but less light intensity on the objects illuminated a range. Varying the wavelength may affect the dispersion angle. The exemplary embodiments provide that the cylindrical lens 130 is optically clear and precisely cylindrical in shape, the laser beam 120 is perpendicular to the longitudinal axis of the cylindrical lens 130, and the laser beam 120 enters the cylindrical lens 130 and passes precisely through the center-line of the cylindrical lens 130 to give a perfectly flat plane of equal bisecting angles from the originating laser pointing path.

FIGS. 2A and 2B schematically illustrate the mixing of colors in the visible spectrum and the resultant colors that are produced or that are visible to the human eyes or that are visible to an imager when original colors are mixed. For example, as illustrated in FIG. 2A, mixing a first-color red 210 with a second-color green 220 produces a third-color yellow 240. Two or more colors may be added or mixed to create different colors, and the colors may not necessarily be in the visible spectrum. There are an infinite number of combinations of independent first and second color laser wavelengths that may create a specific third color. For example, combining blue 230 with red 210 will give magenta, and combining green 220 with blue 230 will average to create cyan.

FIG. 2B illustrates the spectrum of light generally considered visible, in wavelengths from 400-700 nanometers (nm).

It is noted that according to another exemplary embodiment, two wavelengths above and below the visible spectrum, for example infrared (IR) and ultraviolet (UV), may be combined to create a visible light. Furthermore, two different IR laser wavelengths may be combined to form another wavelength in the IR domain, and thermal imagers may be used to detect the third-color intersection.

Figure 3:
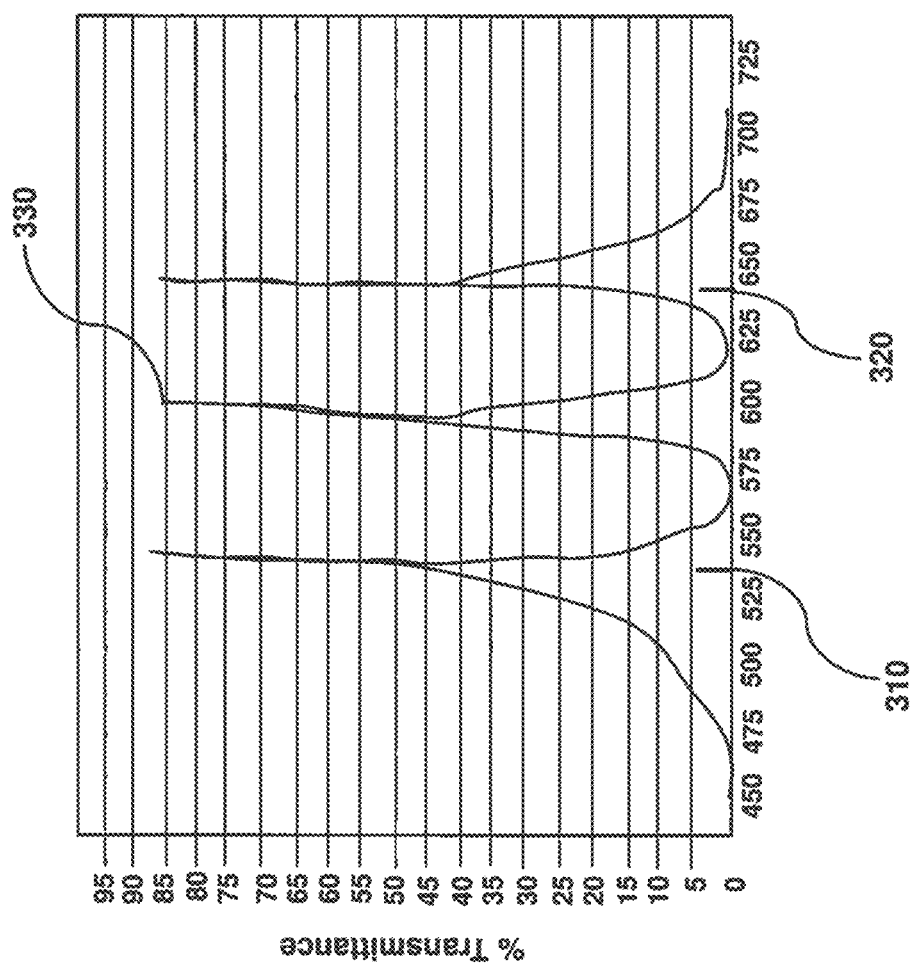
FIG. 3 illustrates an example of a filter response according to an embodiment.

FIG. 3 illustrates the result of a bandpass filter that preferably passes only the red color 320 (at a wavelength of 635 nm) and the green color 310 (at a wavelength of 532 nm). However, there may be circumstances where passing through a yellow color 330 (at a wavelength of 583.5 nm) may also be advantageous. The combination of red and green laser wavelengths may be used to create a yellow wavelength when the red and green colors overlap or intersect. The filter response illustrated in FIG. 3 is an example of a high percentage of red, green and yellow transmission (87% pass-through), and significantly rejects other colors (1-3%). By passing only red and green through a filter that removes all other interfering colors, the signal-to-noise ratio of the yellow intersection color will be enhanced, and the additional spatial understanding benefits from utilizing the relative positions of red and green highlighted objects can be exploited.

Figure 4:
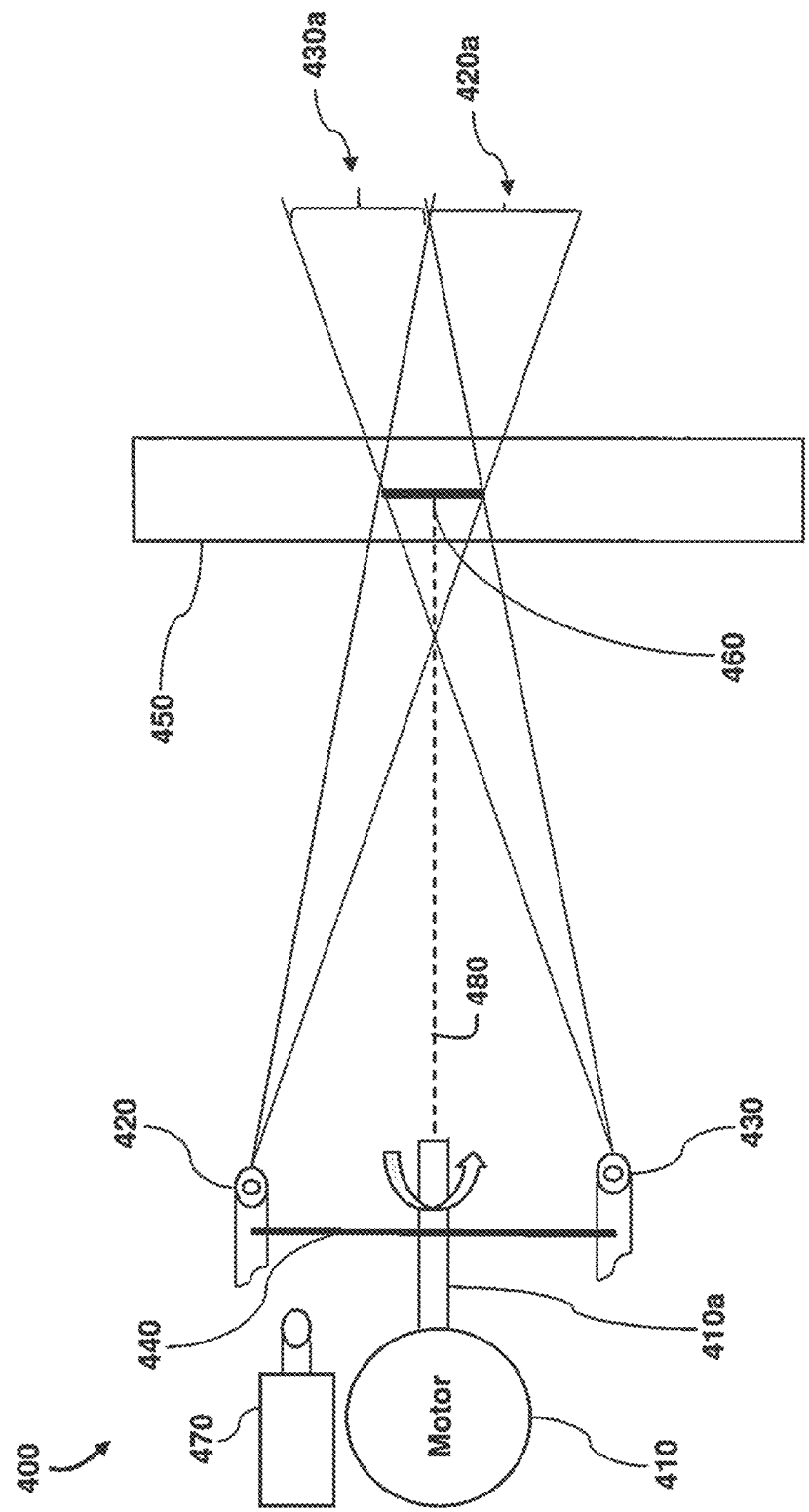
FIG. 4 illustrates an example of a LADAR system according to an embodiment.

With reference to FIG. 4, a LADAR apparatus 400 according to an exemplary embodiment is illustrated. The apparatus 400 includes a motor 410, to which a shaft 410a is attached, a first laser projector 420 projecting a first color, a second laser projector 430 projecting a second color, a rail 440 on which the first laser projector 420 and the second laser projector 430 are attached, and an imager 470. The motor 410 may be a servo drive motor, but is not limited thereto. Although not illustrated in FIG. 4, the first laser projector 420 may be combined with a first cylindrical lens and the second laser projector 430 may be combined with a second cylindrical lens, such as the cylindrical lens 130 of FIG. 1.

The LADAR apparatus 400 may create and rotate an intersecting light plane 460 using two laser line projectors of two different colors. The two laser line projectors are separated by a predetermined distance on rail 440. The motor shaft 410a is perpendicular to the rail 440, and located approximately at the midpoint of the two laser projectors 420 and 430. The motor shaft 410a rotates the entire assembly (e.g., the laser projectors 420 and 430, and the cylindrical lens, such as the cylindrical lens 130 of FIG. 1), and the laser planes 420a and 430a may be pre-adjusted inward so that the intersection of the laser plane 420a and laser plane 430a creates intersecting line plane (or light wall) 460 of a third color at some distance determined by the angles of the laser projectors 420 and 430. The line plane 460 is not restricted to any particular shape, orientation, geometry, or configuration. For example, the line plane 460 is not necessarily flat; e.g., it may be configured as a curved wall. This intersecting line plane (or light wall) 460 forms a third-color (for example, yellow) when two different color planes of light (for example, red and green) intersect. The light combination effect is limited to the range of the intersecting of the light planes 420a and 430b at the intersecting light plane 460. For distances closer than the intersecting area or further away from the intersecting area, the originating two-color planes continue to propagate in the original direction in which the light is being projected without any third-color being generated or observed. Spinning the motor shaft 410a and laser rail 440 causes the intersecting line plane (or light wall) 460 to also rotate at the same rate.

The planes of the colored light fans or laser planes 420a and 430a may be separated by a finite distance but are not preferably parallel. Both laser planes 420a and 430a may be angled preferably equally inward to create the intersecting line plane (or light wall) 460 where the laser planes 420a and 430a intersect. The cross-sectional area of the intersecting line plane (or light wall) 460 depends on the thickness, separation distance and the intersecting angle of the laser planes 420a and 430a. The intersection of the two laser planes 420a and 430a create the intersecting line plane (or light wall) 460 of a third color. For example, the combination of red laser light and green laser light will produce yellow light. These colors are only exemplary, and different wavelengths of light may be used. Additionally, the light does not necessarily have to be in the visible domain.

The location of the intersecting line plane (or light wall) 460 may depend on the distance between, and the angular separation of, each of the two created laser-line planes (or light walls) 420a and 430a, and the length of the intersecting line plane (or light wall) 460 is a function of the divergent angle of the laser-line planes (or light walls) 420a and 430a and the distance from source to intersection of the laser-line planes (or light walls) 420a and 430a. The color of the intersecting line plane (or light wall) 460 is the average wavelength of the two laser projectors 420 and 430.

By creating a mechanism to rotate the two laser projectors 420 and 430, while maintaining preferably the same inward-tilting angle, the created intersecting light plane 460 also rotates in a three-dimensional (3D) space at a preferably fixed range of intersection.

With continuing reference to FIG. 4, an imager 470, for example, a high-frame-rate camera or video capture device, may be collocated near the axis of rotation of the shaft 410a, and may point in the direction of the light planes 420a and 430a. The imager 470 with suitable bandwidth to include red, yellow and green wavelengths in this example, may capture the area where the rotating planes of light 420a and 430a are moving, and any third-color intersecting light plane 460 resulting from an object 450 being at the correct depth. Since the field-of-view of the camera 470 is fixed and preferably not rotating, and the depth of ranging is constant and known, every pixel that might be illuminated with the intermodulation color corresponds to an azimuth and an elevation pixel in the field-of-view, which may be converted to a range, horizontal and vertical (X,Y,Z) coordinate at the particular time of frame capture. Each successive frame or capture, at some delta-time, digitizes the new (X,Y,Z) pixel locations that may or may not contain object sections at the correct color wavelength. If the object 450 and the rotating laser system, (which includes the laser projectors 420 and 430 connected to the rail 440), have not changed in range (X), the illuminated pixels from subsequent captures continue to add resolution to that one depth of field because of sampling at varying angles.

The pixel locations in the imager 470 that have sufficient intensity of the correct wavelength indicate an object portion at that range and instantaneous angle. A slower moving object has more frames than an object of the same size that is moving at a faster rate. Creating a 3D LADAR "point cloud" or cube representation with only those properly highlighted pixels as, alternatively, the depth of intersection is varied, thereby calculating an instantaneous range as a function of angles, also creates a LADAR image cube, suitable for rotation, range gating, false coloring, or shape analysis image processing techniques.

The 3D point cloud represents numerous (X,Y,Z) pixels that exceed a threshold for yellow color content when a movie file is processed frame by frame. An algorithm breaks a movie clip into individual Joint Photographic Experts Group (JPEG) images of every frame in the video sequence. The algorithm may take the first JPEG frame, assign it an X-index of 1 representing the first range, filter out all colors except a particular color, for example, yellow, compare every pixel to see if the pixel falls within a maximum and minimum intensity range (brightness of yellow), and then create a set of (X=1,Y,Z,intensity) coordinates that only include those yellow pixels in the first frame (X=1) satisfying the threshold requirements. The algorithm then goes to the second JPEG representation of frame number X=2, and creates another set of CSV values (X=2,Y,Z,intensity) associated with yellow locations in the two-dimensional (2D) JPEG satisfying the threshold. The algorithm goes through every JPEG of the movie clip, concatenating every (X,Y,Z,intensity) into a massive matrix of the 3D point cloud covering a range of 1 to N, where N represents an incremental range associated with the velocity of the relative motion and the frame rate of the video capture mechanism. Very high frame rates with a slow motion of the LADAR will create very small incremental distance steps for each frame. A plotting routine then creates a 3D plot of every (X,Y,Z) and therefore does not plot anything from the original movie that either does not have a yellow color, or falls below a predetermined threshold.

Accordingly, a 3D representation of objects in the field-of-view of the camera 470 may be created by isolating the third color intersection highlights, (for example, yellow), from scanning objects with two-color laser planes 420a and 430a. A significant advantage of the spinning third-color intersection plane at a known fixed distance is that each captured frame contains the instantaneously highlighted [Y,Z] pixel locations for every sequential image or color capture [X-distance due to relative motion]. Successive images derived from movement of at least one of the apparatus and target create a new depth measurement (X).

Although the imager 470 is indicated as being a camera, this is only exemplary, and the imager 470 may also be some form of detector array, phased detector, line-array, or single sensor that may determine the location of received light. This circular plane of the third color intersecting light plane 460 produced from rotating the two light planes 420a and 430a in synchrony may preferably be perpendicular to the line of rotation 480, and the instantaneous position of the line is defined by the rotation rate.

When the object 450 or the LADAR apparatus 400 move with respect to each another along the X-axis, every successive capture documents a new depth map of the scene or detection area. When used for building a 3D model, each new depth represents a new X coordinate, and the rotating third-color intersection line creates appropriate numbers of (Y, Z) points based on the pixel location in the field-of-view. Changing the field-of-view also changes the coordinate in space that each (Y, Z) point corresponds to, while also changing the pixel density as a function of area covered of the moving third-color light-plane.

If an object 450 is not located at the instantaneous position of intersection of light planes 420a and 430a, the laser projectors 420 and 430 do not combine to reflect or refract the third color intersecting light plane 460. Objects at the incorrect ranges illuminate with either one or the other wavelengths, but not both. Objects that appear near the intersection region begin to see both wavelengths at a decreasing separation, and as this object moves into the exact intersection range the third color is visible. As the light planes 420a and 430a are projected in a direction beyond the intersection area of intersecting light plane 460, the separation of the two original colors projected from laser projectors 420 and 430 reappears with reversed offset. For example, at a specific point in time when the laser planes 420a and 430a are vertically oriented, if the light that is projected from laser projector 420 is a red color, prior to entering the intersection plane 460 this red color appears to the left of the intersection plane 460. Upon exiting the intersection plane 460, the red color will appear to the right of intersection plane 460.

Similarly, if the light that is projected from laser projector 430 is a green color, prior to entering the intersection plane 460 this green color appears to the left of the intersection plane 460. Upon exiting the intersection plane 460, the green color will appear to the left of intersection plane 460. As the laser planes 420a and 430a rotate to other angles, the reversed offsets of each color will follow the same described behavior before and after the intersection range. Image processing algorithms can take advantage of color separation distance, linearity of highlights, and relative position to better understand the shape features and size of object 450.

The LADAR apparatus 400 may create a light-wall of a cylindrical shape, the radius of which depends on the intersection depth of the object 450, and the height of this cylindrical wall may be a function of divergence of the beam projected from respective laser projectors 420 and 430, the range between the object 450 and the LADAR apparatus 400, the type of lens 130 (FIG. 1), and the location of the intersection in a ground plane.

An example of this would be to create a 360-degree cylindrical wall of light surrounding a helicopter for the purposes of collision avoidance by detecting objects crossing an intersection line curved plane with the correct merged color, where the merged color is a mixture of a first color projected from a first laser projector (for example, laser projector 420) and a second color projected from a second laser projector (for example, laser projector 430). Three systems may be mounted on the helicopter's blade tips to exploit the cylindrical optical barrier fused with two fixed-planes above and below the aircraft to completely enclose the entire vehicle. This may also be accomplished by one system rotating on two axes so that the center of the rotating plane is moved throughout 360-degrees in both the horizontal and vertical planes. This may create a synthetically thicker depth of imaging due to the overlapping regions the rotated plane traverse. Varying the angle rotation of the laser sources is not necessary to inspect various regions, however rotating the laser sources in either the horizontal or vertical plane may add valuable diversity of inspection. Instantaneously and continuously monitoring the angles of the laser line planes or light walls (to give range to intersection lines) and the rotation angle (to know which (Y,Z) pixels should be illuminated by the instantaneous angle of intersection line).

Figure 5:
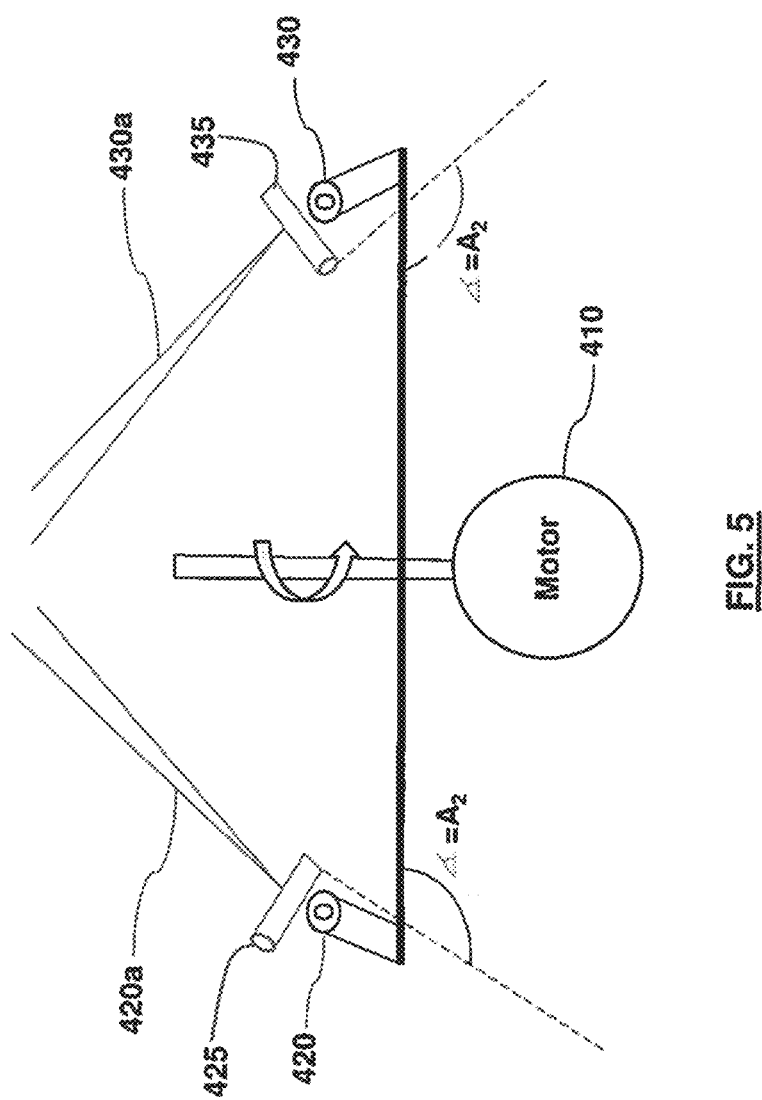
FIG. 5 is an illustration of a system for adjusting the laser sources according to an embodiment.

Turning now to FIG. 5, the adjusting of the laser sources is illustrated. According to an exemplary embodiment, angles of the laser projectors 420 and 430 may be adjusted in order to vary a downstream intersection point of the laser planes of the laser projectors 420 and 430. By adjusting both laser line projectors 420 and 430, and their respective lens 425 and 435, to a more acute angle, the effective depth to intersection may be reduced. The diameter of the laser beams 420a and 430a emitted by the respective laser projectors 420 and 430, the separation between the two laser projectors 420 and 430, and the range to the intersection point of the laser planes may define how well the laser planes may be combined and the dimensions of the over-lapping line-region.

Figure 6:
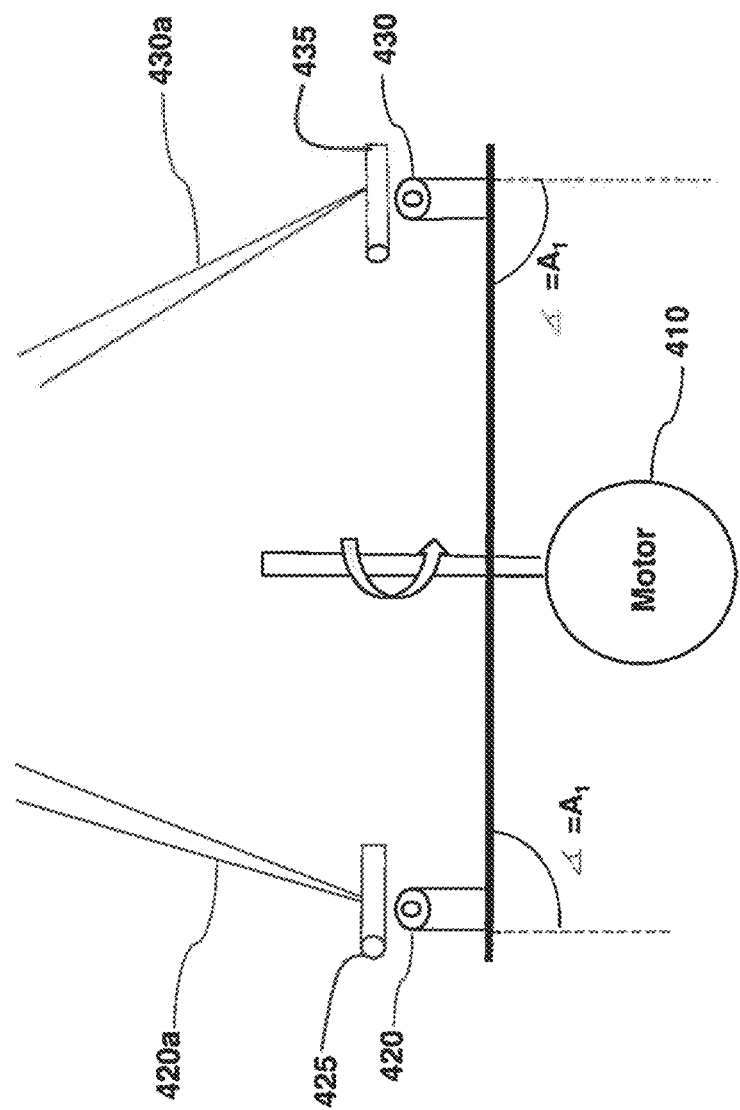
FIG. 6 is an illustration of another system for adjusting the laser sources according to an embodiment.

FIG. 6 illustrates another method of adjusting the pivot angles of the laser plane. As illustrated, a larger angle indicating a further intersection range or region of the laser planes 420a and 430a may be obtained by pivoting the laser projector 420 and the laser projector 430 in an inward direction. It is noted that the laser source may include the combination of the laser projector 420 and the cylindrical lens 425. Since two parallel planes do not intersect, both lasers must be steered inward from the perpendicular rail on which they are mounted. The greater the distance that the laser-plane intersection point is away from the LADAR system, the deeper the intersection region is due to divergence of the beam and a larger overlapping region.

Figure 7:
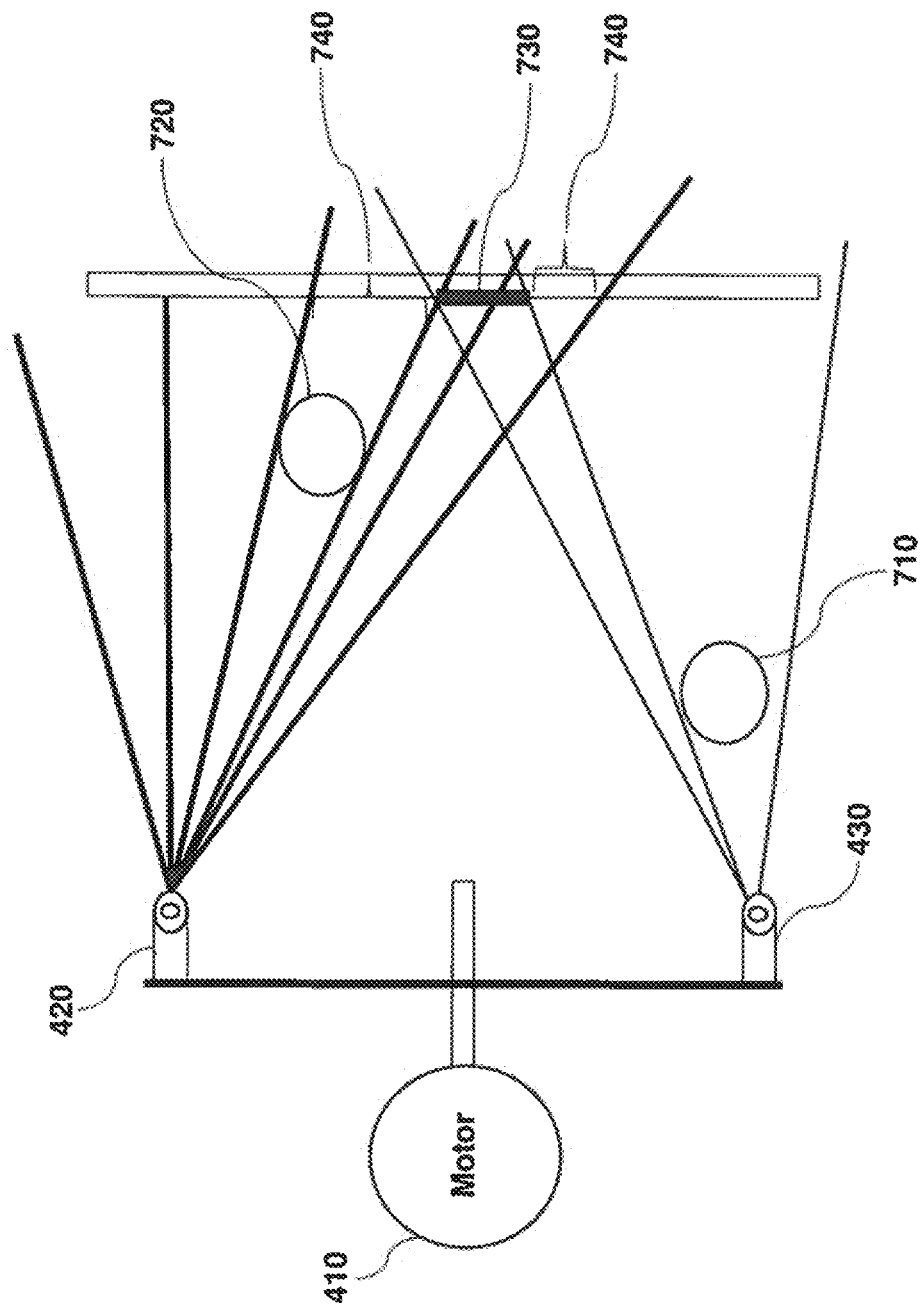
FIG. 7 illustrates an effect of blocking the laser planes according to an embodiment.

FIG. 7 illustrates the effects of the blocking of the laser plane transmission by various objects. The two light-planes may be partially or fully obstructed by an object 710 or 720 in the path of the light. Objects 710, 720 that are illuminated with one color will block a region 740 down range from being illuminated with that color. However, portions of each color fan will make it further downrange and still have the potential to combine into a third-color 730 if the range is correct. This ability to bypass objects is greater for larger laser separation distances.

Figure 8:
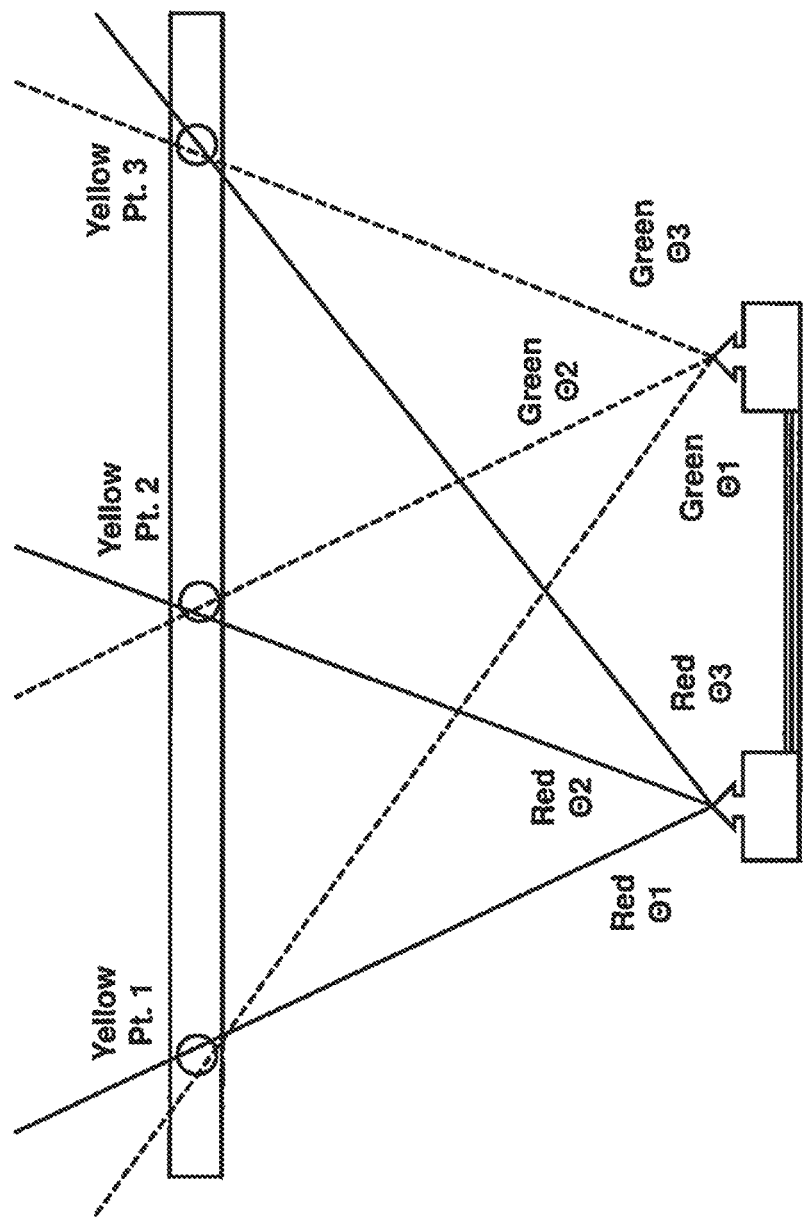
FIG. 8 is an illustration of the steering of the laser planes to create the intersecting third color according to an embodiment.

FIG. 8 illustrates the steering of two laser planes (for example, red and green) to create the third color (yellow) intersection region. As illustrated, the two independent color laser light plane angles of emission may be steered to an angle with a predictable intersection point, thereby creating a third-color plane at the three discrete locations, "Yellow Pt. 1", "Yellow Pt. 2", "Yellow Pt. 3", shown in this example. Angles Red-$\theta$1 and Green-$\theta$1 may be different to create intersection "Yellow Pt. 1." "Yellow Pt. 2" and "Yellow Pt. 3" may be created using Red and Green angles $\theta$2 and $\theta$3, respectively.

An infinite number of Red and Green angle pairs will create a continuum of Yellow intersection lines, thus creating a steered flat plane in this exemplary embodiment. The angle of the laser beams may be modified in various manners such as by utilizing microelectromechanical systems (MEMS) and actuators. Additionally, an electromechanical lens manipulation may modify the throughput angle. Diffraction optics may also be used to steer the beams.

The steering method described herein could also choose Red and Green angle pairs to prescribe an arc of a specific radius from the midpoint of the two laser sources, thus illuminating objects exactly at a fixed and constant range. In contrast, when creating a flat third-color plane, the distances may vary along the light plane when referenced to the midpoint of the two color laser projectors. The rotating methods described herein maintain constant the perpendicular distance from the midpoint of the laser sources to the midpoint of the third-color plane.

Figure 9:
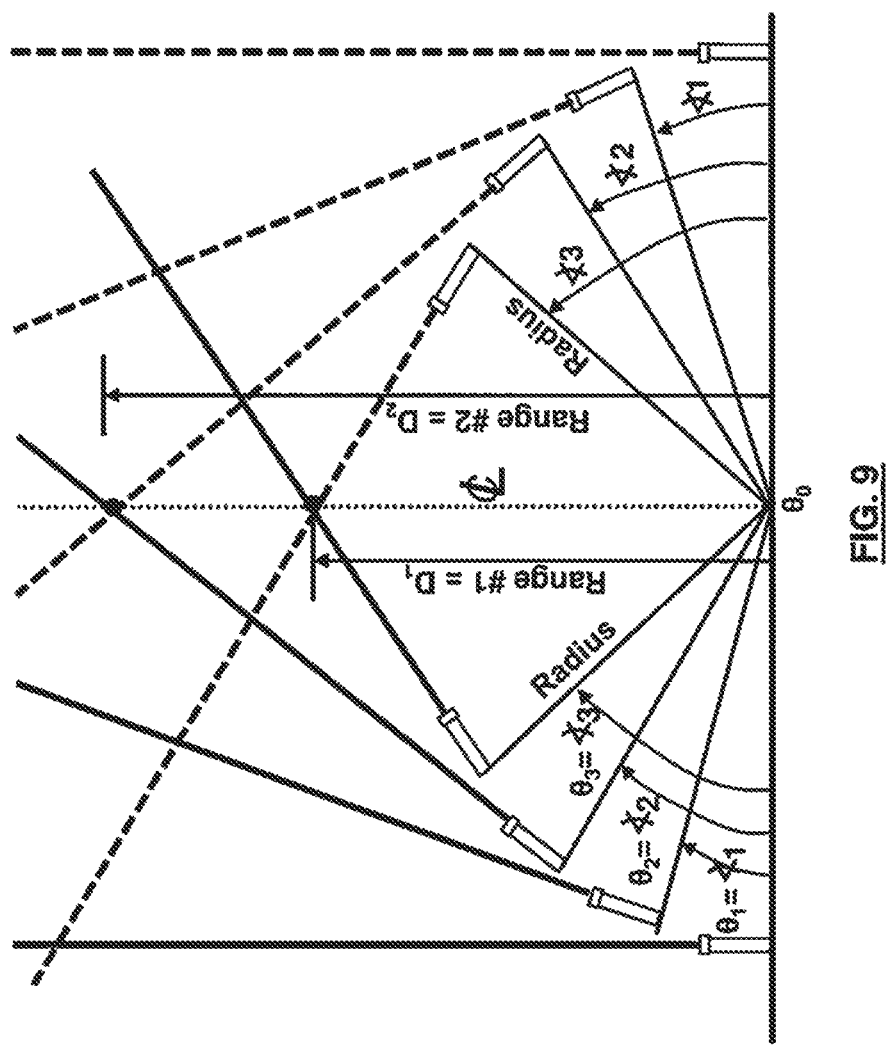
FIG. 9 illustrates a method for changing angles of the projected beams according to an embodiment.

FIG. 9 illustrates a method for changing angles of projected beams to create different intersection ranges of the light planes. A fixed perpendicular angle may be maintained between each laser and the hinged rotating arms of the LADAR. The symmetrical angle of the rotating arms may vary to change the intersection range. $\theta_0$ is shown as perpendicular to the rotating frame, which would create a condition of parallel lines that never intersect. $\theta_1$ to $\theta_3$ create intersection ranges at decreasing ranges, respectively. Alternatively, the arms may be fixed colinearly and both lasers may be angled inward at the similar angles to create the same effect as above.

Figure 10:
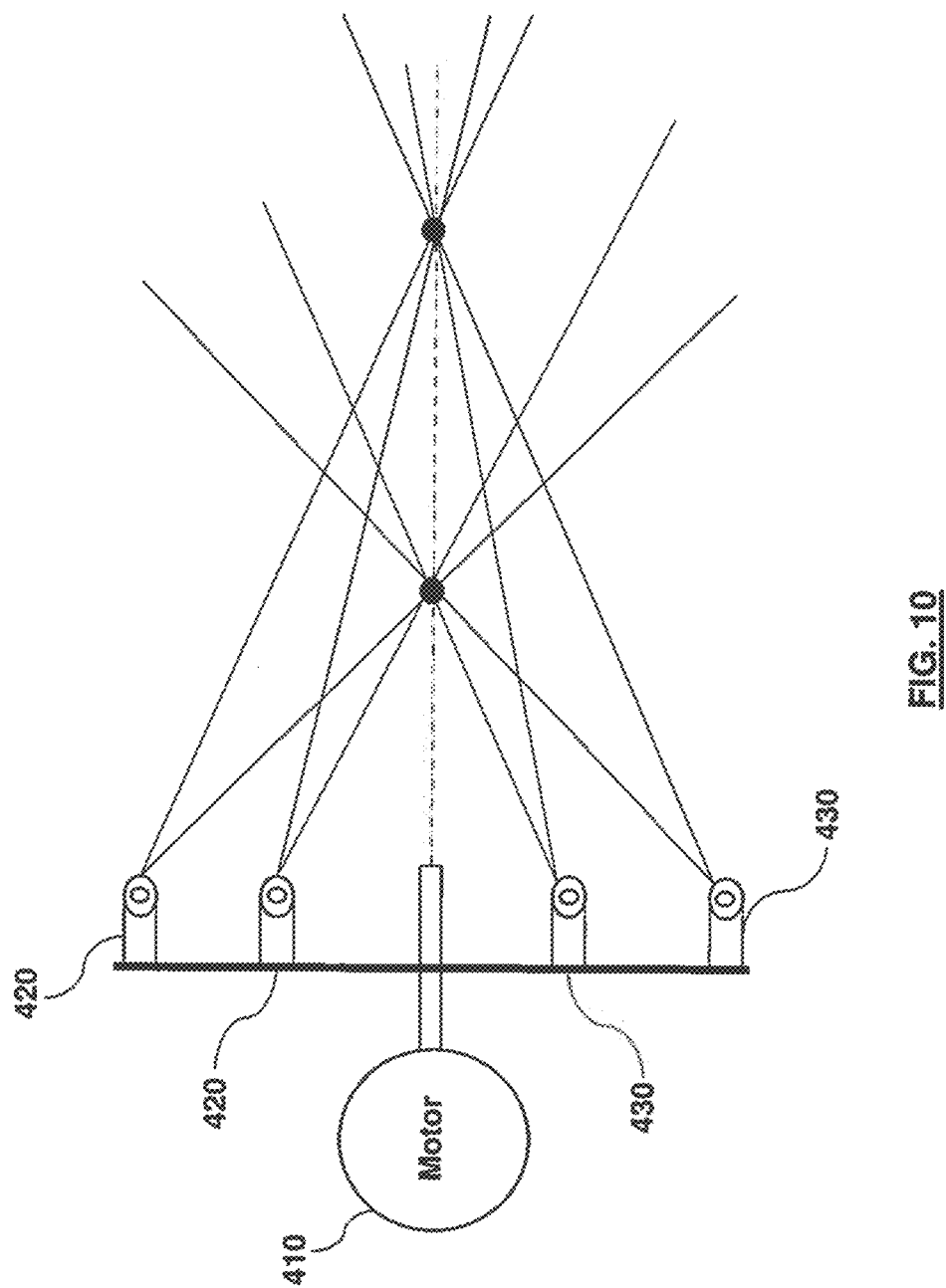
FIG. 10 is an illustration of the effect of multiple intersection ranges according to an embodiment.

FIG. 10 illustrates the effect of multiple intersection ranges according to an exemplary embodiment. Combinations of two or four line colors may create multiple simultaneous intersection points. Utilizing four different wavelengths may create many intersection regions at differing intersection depths, each with their own unique third-color intersection wavelength.

Figure 11B:
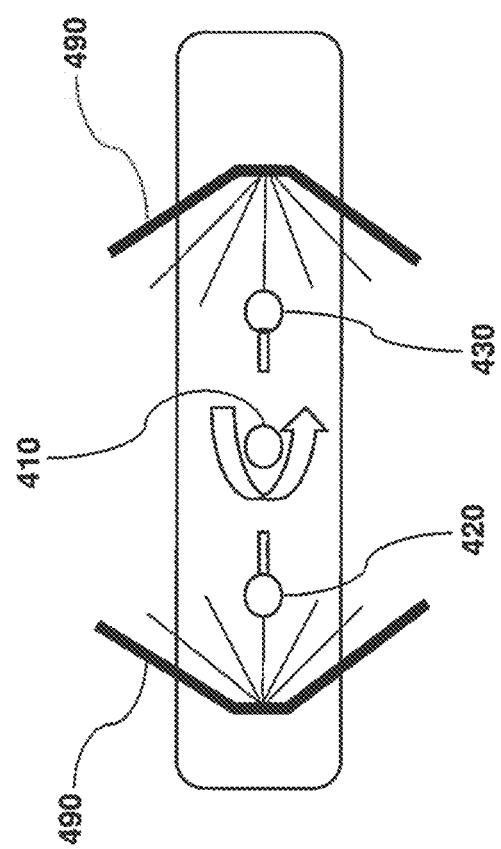

FIGS. 11A and 11B illustrate another exemplary embodiment of the application wherein the laser projector (420 and 430) and cylindrical lens (425 and 435) pair are attached to aircrafts. For aircraft or helicopter applications, the laser and cylindrical lens pairs 420/425 and 430/435 may be configured near the center of rotation of the shaft of the motor 410 so that the energy required for rotation may be lessened due to a decrease in moment-of-inertia. The side-view as illustrated in FIG. 11A and the top-view as illustrated in FIG. 11B show schematically how this may be implemented in a two-blade system. Although only two blades 445, 455 are illustrated in FIG. 11A, this is only exemplary, and multiple blades may be added for additional LADAR capability, such as multiple ranges or cross-hair pattern scanning at the same range.

The ends of the rotating arms or blades 445, 455 may have mirrors 490 configured in such a manner as to reflect the red and green light planes inwardly for an intersection region at either a fixed depth, or variable depth by changing the mirror angles of the mirrors 490 with, for example, an electromechanical mechanism, linear motor, or piezoelectric actuator.

Although the mechanisms are illustrated on the external portions of the blades, this is only exemplary, and the mechanisms may be internal to the blades, with preferably an optical window for laser-plane egress to further reduce air drag or exposure to the harsh environment.

Additionally, slip rings (not shown) may provide power for the lasers and mirror actuators, thereby removing excess weight from batteries or other power generation methods. Optical transfer rings, fiber-optics, couplers, mirrors and other mechanisms may be utilized to remove the lasers and cylindrical lenses from the blades completely to shift the weight off of the spinning assembly 410, 420/425, 430/435, and 490, and to further lower the momentum penalty of excess hardware on the spinning blades.

Figure 12:
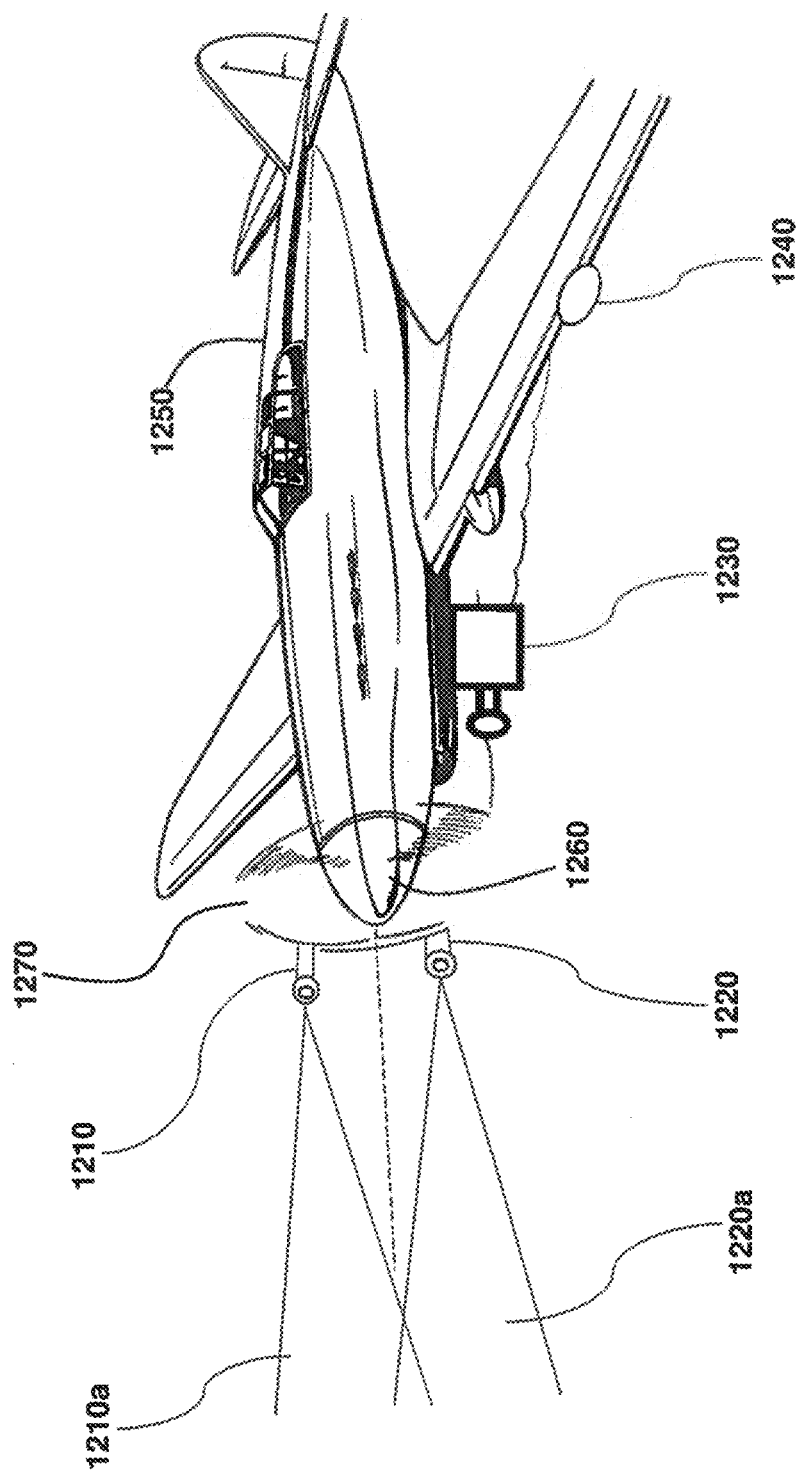
FIG. 12 is an example of applying the LADAR system to fixed wing aircraft according to an embodiment.

Turning now to FIG. 12, an application of the LADAR system 1210, 1220, and 1230 to fixed-wing aircraft 1250 is illustrated. According to the exemplary embodiment, the laser projectors 1210 and 1220 may be attached to the propeller of the aircraft 1250, with the camera system 1230 located underneath the hull of the aircraft 1250 to capture appropriate third color 3D highlights. The camera system 1230 may also be located at the center of rotation in front of the propeller hub 1260 with pass-through design methods to maintain mechanical orientation, power and data pathways. This is only exemplary, however, since the laser projectors 1210 and 1220 may be attached to the wings of the aircraft 1250.

An open-center propeller 1260 and open-core rotor-stator motor (not shown) may enable the camera system 1230 to be located in front of, or behind the plane 1270 of the spinning propeller 1260 and peer through its open core or a mechanism may be extended through this open core. The camera system 1230 may be fixed in orientation relative to the mostly level flight of the fuselage of the aircraft 1250.

For a rocket or projectile (not shown) spinning in flight, a camera 1230 attached to the rocket or projectile would most likely rotate at the same rate as the third-color intersection plane 460 (FIG. 4). The camera 1230 may also be stabilized within a rotating projectile (not shown). The third color intersection plane 460 (FIG. 4) may remain in approximately the same location within the field-of-view of an imager 470 (FIG. 4) also rotating with the projectile body. Therefore, image processing algorithms, with inputs from INS/GPS to define an instantaneous position of the intersection plane relative to a level plane, would be used to create a 3D rendering of the sensed object. Although a camera or imager 1230 are discussed above, this is only exemplary, and a linear array of optical detector elements, optimized for the third color may be implemented, with or without lenses focusing in the forward area perpendicularly outward in the direction of the emitted laser planes.

The LADAR apparatus 400 of the exemplary embodiments may augment the third color with a flash of light in the third color bandpass so that the entire object in the field of view is illuminated instantly. The yellow threshold on the entire target would be satisfied in order to produce an instantaneous silhouette of the target object at that range. Repeat flashes at known intervals may be used to compare size or aspect changes of the complete silhouettes for better classification or dynamic motion assessment.

Figure 13:
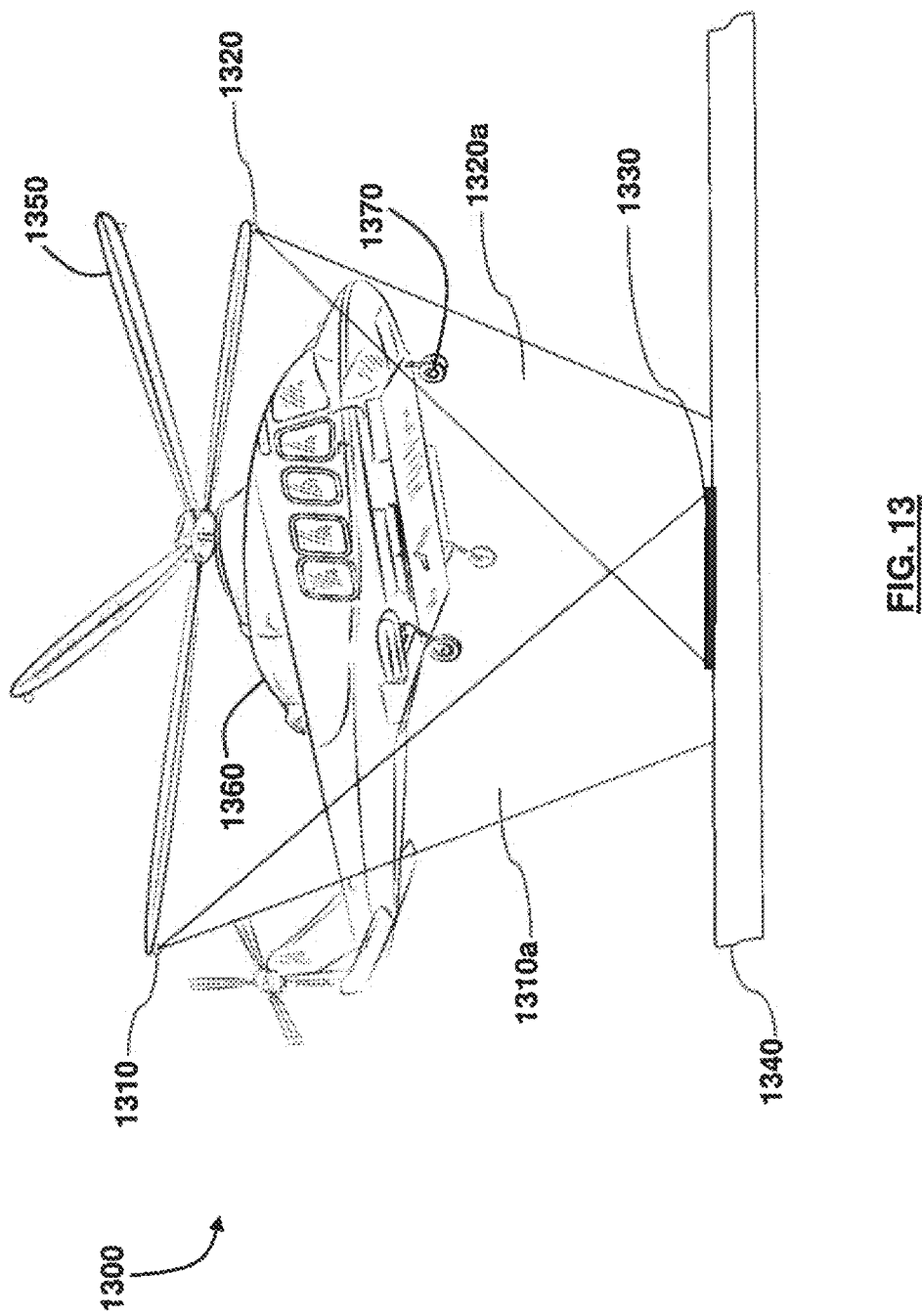
FIG. 13 illustrates an example of applying the LADAR system to helicopter blades according to an embodiment.

Turning now to FIG. 13, a helicopter collision avoidance system 1300 implementing a LADAR mechanism according to another exemplary embodiment is illustrated. When applied to the blades 1350 of a helicopter 1360, the laser beams 1310a, 1320a may be projected in a direction perpendicular to the helicopter's skids 1370 in an essentially downward-pointing configuration. This provides 3D LADAR imaging below the helicopter 1360 to facilitate landing in degraded visual environments, thus avoiding trees, buildings, powerlines, or other obstacles in a flight path.

A single wide-angle imaging system (not shown) looking below the underbelly of the airframe of the helicopter 1360 would provide the imaging for 3D LADAR processing. In a horizontally-projecting configuration, the LADAR's third color intersection plane's normal direction would also rotate in the full 360-degree azimuth in sync with the pairs of red and green light-planes 1310a, 1320a forming a cylindrical third-color light plane. The imager (not shown) may either be mounted on the rotating blades 1350 of the helicopter 1360 to look in all directions in sync with the rotating blades 1350, or preferably multiple imagers may be mounted with fixed orientations on the airframe of the helicopter 1360 in, for example, the four quadrant directions, providing continuous views relative to the helicopter's frame of reference. This could allow for power-line avoidance in the forward flight path, or the light planes 1310a, 1320a may be oriented, for example, 45-degrees downward to create a conical light-wall or fence at a range below the airframe of the helicopter 1360 for RPG detection in the full lower hemisphere to initiate active countermeasures, blind the seeker imager, or conduct evasive maneuvers. In each of these configurations, multiple light-planes 1310a, 1320a may be projected in opposing or complementary directions to simultaneously provide 3D images above and below, for example, or both front and back, and provide twice the imaging update rates.

Figure 14:
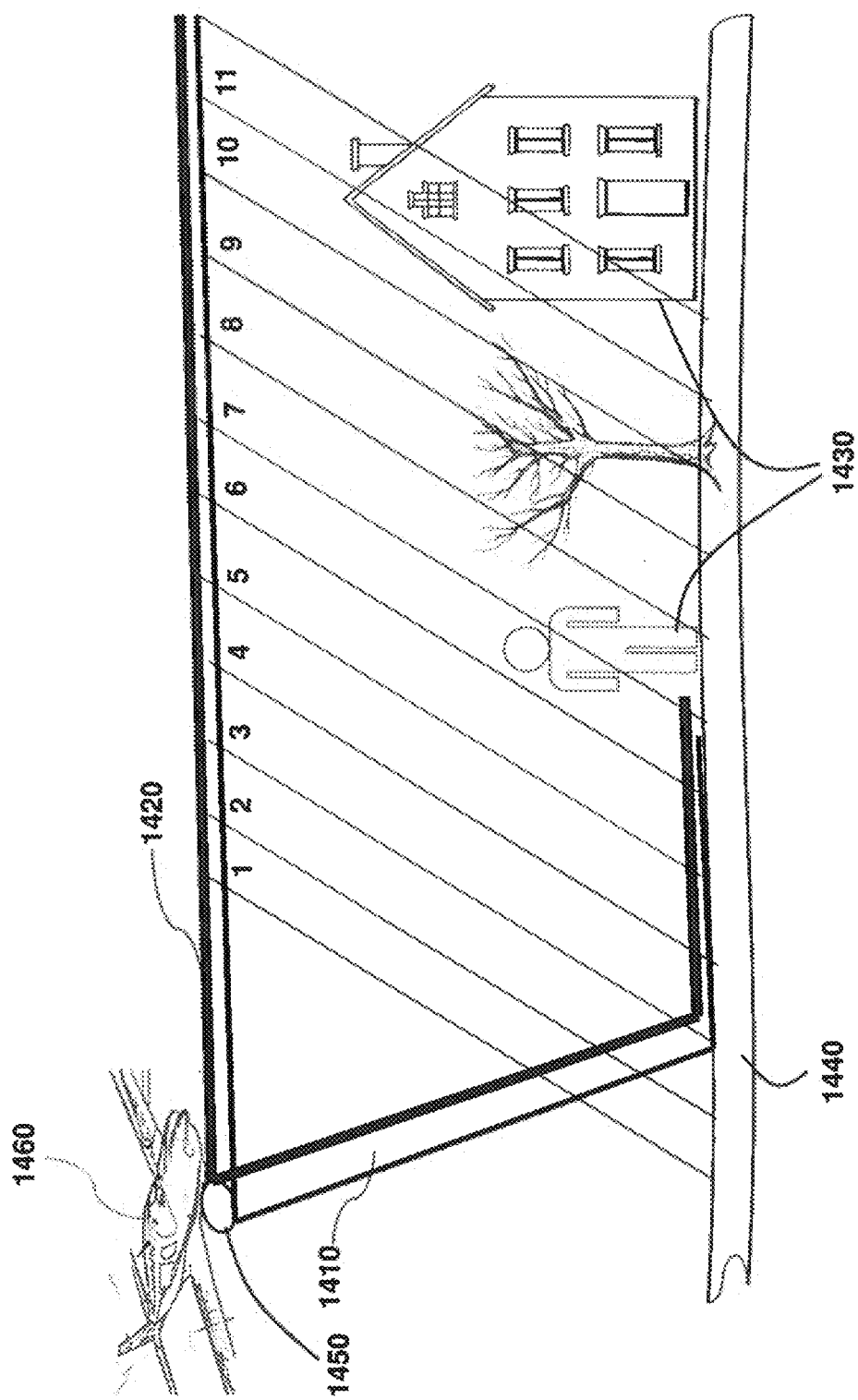
FIG. 14 illustrates an example of using the LADAR system on rotating plane propellers according to an embodiment.

Turning now to FIG. 14, rotation planes for illumination of objects 1430 in the ground plane 1440 is illustrated. A dedicated rotating or steered LADAR system 1450 may be mounted as a payload on an aircraft or vehicle 1460. FIG. 14 illustrates an approximately 45-degree down forward LADAR configuration for imaging the ground plane 1440 along the flight path of aircraft 1460 or pathway of a vehicle (not shown). The lines numbered 1-11 in FIG. 14 represent the third color intersection light planes sampled at 11 discrete times, highlighting the object portions at the proper fixed range for each instance of capture. As the aircraft 1460 moves forward, the scanning rate, frame-rate, field-of-view, and velocity of aircraft 1460 will all contribute to the effective volume pixel (voxel) of the LADAR.

Figure 16:
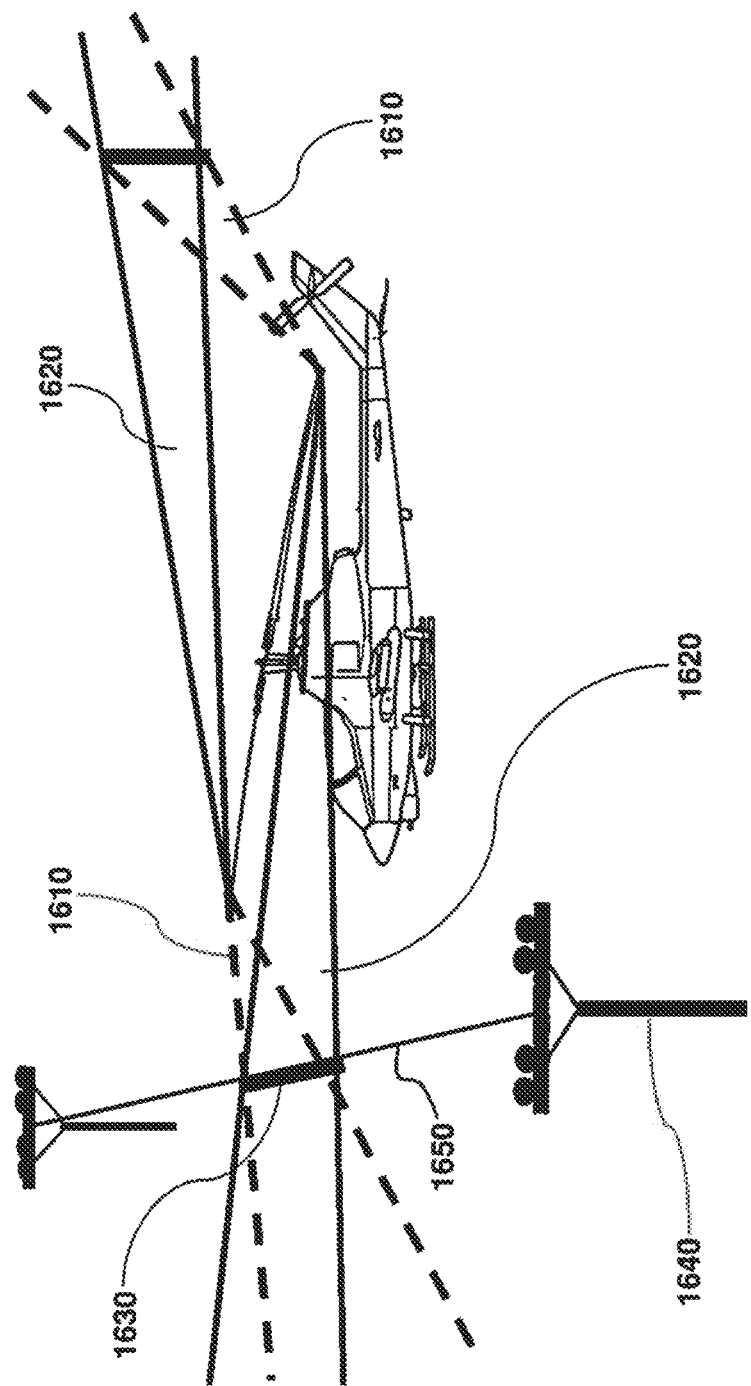
FIG. 16 illustrates an aircraft collision avoidance system according to an embodiment.

It is to be noted that in exemplary embodiments, the LADAR system may be implemented in a static position, (e.g., it may not be mounted on an airframe or vehicle, or in a stationary vigilance mode), and objects moving relative to the LADAR system may be imaged. For example, the LADAR system may be positioned on a stationary aerostat (not shown), tall tower (not shown), or building, or a hovering helicopter (FIG. 16). In that case, static objects in the field of view at the proper range will maintain a third color, for example, yellow, if the transmitted light planes are red and green, and moving objects within the field-of-view will be appear as intermittent red or green and only turn yellow when the object is located at the exact predetermined intersection range. Image processing looking specifically for this third color (yellow) changes can alert when an object crosses a yellow light-fence at a predetermined range.

Figure 15:
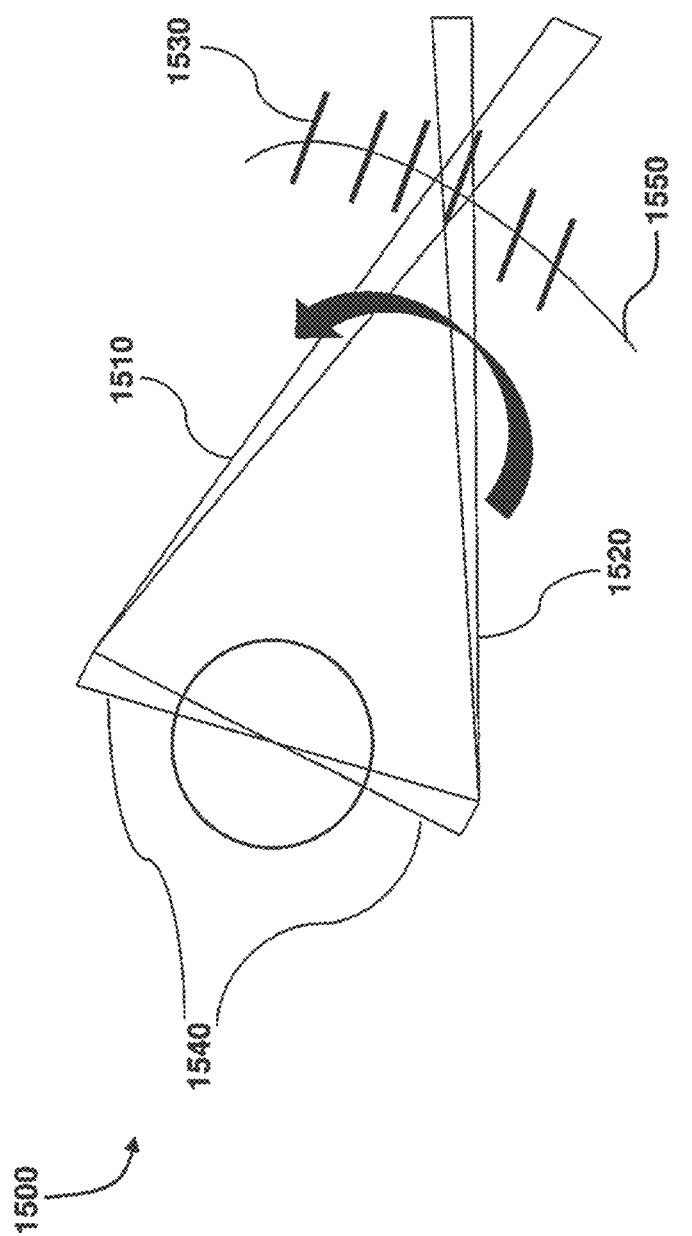
FIG. 15 illustrates an example of a horizontal and forward illumination system according to an embodiment.

Turning now to FIG. 15, a horizontal and forward illumination system 1500 for helicopter collision avoidance is illustrated. In a forward area scanning exemplary embodiment, a cylindrical light-wall or fence 1550 may be created at a specified range. The range may change with each rotation of the blades 1540 of the helicopter due to airframe motion. The emanations from two colored light-planes 1510 and 1520 may be gated to only project in the forward direction, and may be imaged with a camera (not shown) that is looking in a forward direction. The system 1500 may detect objects 1530 that are illuminated in the third color yellow due to intersecting planes at a preset standoff range, and the detected objects 1530 may be updated with every blade pass.

Two color light planes 1510, 1520 may project both in a forward and rearward direction from the blades 1540, and may be activated only for forward motion of the airframe of the aircraft (not shown), thereby doubling the update rate by using the fronts and backs of each blade pass. This gating mechanism could also be tied into the INS/GPS of the helicopter, so that if the helicopter is sliding in a particular direction, the gating may be adapted to only warn of objects in that intended direction of motion.

Objects such as power-lines, drones, and even birds may be detected with 3D image processing of yellow-highlighted pixels. The position, velocity and trajectory of the targets may be determined by implementing the two color plane reversal effect on the object before or after the intersection range, and relating those two-color highlights to the yellow intersection color, using multiple passes and frame captures.

If an imaging system allows red, green and yellow colors to be collected, the time-difference between when the red and green non-superimposing beams hit the target will indicate range-to-target when the angle between the two originating laser planes and the angular rotation rate are known. The farther the target is from the third-color intersection range, the larger the time between the individual red and green passes. Temporal and spatial changes of this parameter can indicate velocity or maneuvering of the target if the LADAR system's velocity is constant or accounted for using a sensor.

Turning now to FIG. 16, an aircraft collision avoidance system according to another exemplary embodiment is illustrated. The cylindrical third color plane 1630 may be created from the intersection of a first light plane 1610 and a second light plane 1620, and may illuminate regions that highlight objects such as power-lines 1650, towers (not shown) or trees (not shown). Fore and aft projections may double refresh rates.

Figure 17:
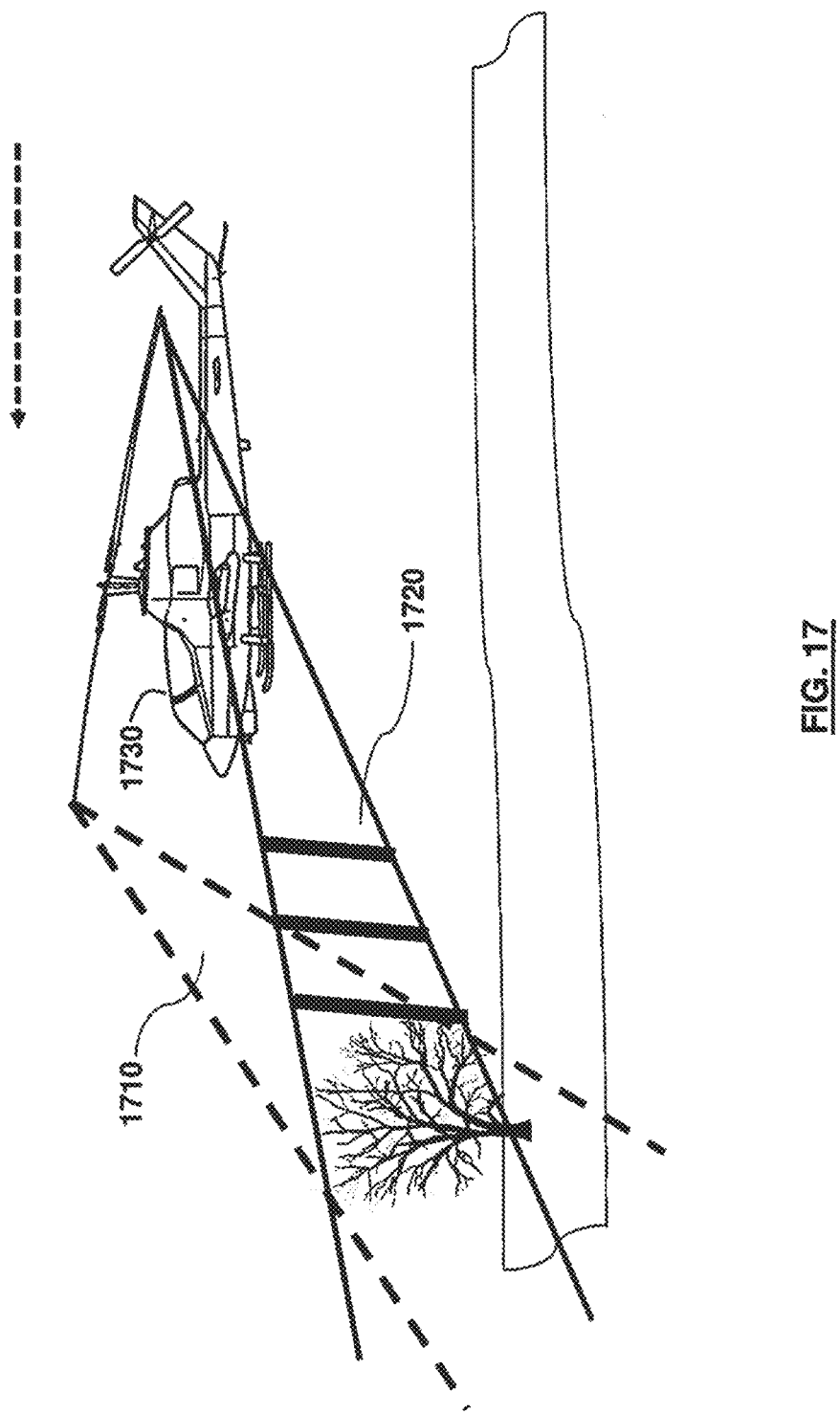
FIG. 17 illustrates an example of facilitating forward and downward mapping according to an embodiment.

FIG. 17 schematically illustrates a system implemented on a helicopter 1730 that facilitates forward and downward mapping of routes. A first light plane 1710 and a second light plane 1720 may be projected from a first projector (not shown) and a second projector (not shown) attached to the helicopter 1730. The downward angle and range-to-intersection of the first light plane 1710 and the second light plane 1720 can be adjusted to conduct route mapping and collision avoidance for the helicopter 1730, an unmanned aircraft system (UAS) or aircraft (not shown). The voxel size, update rate, and spatial pixel density will be a function of the revolutions per minute (RPM) of the blades of the helicopter 1730, airframe velocity, range to the intersection region, separation of the originating two color light-planes 1710 and 1720, beam divergence, number of pixels, and field-of-view of the imager (not shown).

Figure 18:
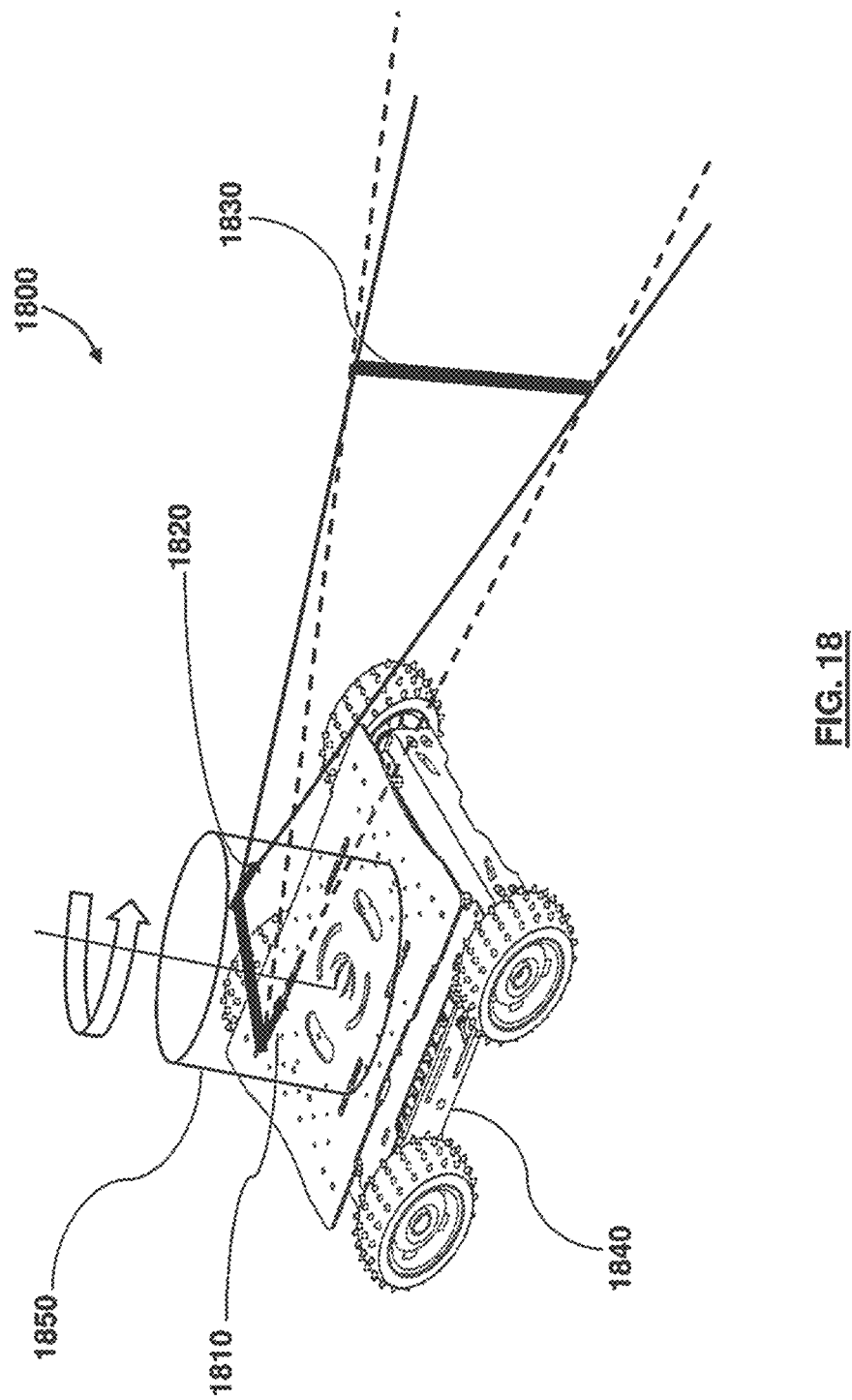
FIG. 18 illustrates another example of applying the LADAR system according to an embodiment.

FIG. 18 illustrates a LADAR system 1800 as implemented on a robotic vehicle 1840. The robotic vehicle 1840 may have a rotating line of vision and the LADAR system 1800 may revolve 360 degrees to create range maps around the robotic vehicle 1840.

Ground vehicles, robots, trains, etc., may all apply the exemplary embodiments for situational awareness, collision avoidance, 3D mapping of tunnels or buildings or autonomous movements. FIG. 18 illustrates an exemplary embodiment of a fixed range spinning LADAR. The LADAR system may include an enclosure 1850 such as a glass container, a first laser projector (not shown) projecting a first laser beam 1810 and a second projector (not shown) projecting a second laser beam 1820. The first laser beam 1810 of a first color and the second laser beam 1820 of a second color may intersect to create an intersection plane 1830 of a third color. The LADAR system may provide at least one fixed range estimate for objects at the third color intersection range at the intersection plane 1830. The ability to dynamically vary the angles of the originating two laser light planes 1810 and 1820 may enable the scanning of a different range with every revolution. With continuous knowledge of the emanation angles and azimuthal scan angle, the third color intersection line will be at a known range and azimuth, and yellow pixels from an imaging system may be accurately placed in 3D space to develop an image cube around the robotic vehicle. Elevation angles of the emitting light-planes may also be varied upward, for example, to image the ceiling above the robotic vehicle 1840. A hemispherical lens (not shown), sometimes called a fish-eye lens, may continuously image the entire upper hemisphere for multi-beam surveillance. Slip rings (not shown) may also provide power to the rotating assembly motors and lasers to reduce the mass of the moving parts of the LADAR assembly to increase speed of rotation.

FIG. 19 is a flowchart illustrating a method 1900 of creating an intersecting objection detection beam according to an exemplary embodiment. The method may be implemented as one or more modules in a set of logic instructions stored in a machine or computer-readable storage medium such as random-access memory (RAM), read only memory (ROM), programmable ROM (PROM), firmware, flash memory, etc. in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 1900 may be written in any combination of one or more programming languages, including an object-oriented programming language such as C, JAVA, or the like.

In illustrated processing block 1901, a first laser beam of a first color is projected with a first laser line projector. The first color may be red, but is not limited thereto. In illustrated processing block 1902, a second laser beam of a second color is projected with a second laser line projector. The second color may be green, but is not limited thereto. In illustrated processing block 1903, a laser plane of the first laser beam and a laser plane of the second laser beam are adjusted to create a beam intersection line plane (or light wall) of a third color on an object at a predetermined intersection range from the first laser line projector and the second laser line projector. The third color may be yellow, which is a combination of the first color red and the second color green. The method may comprise projecting multiple laser beams simultaneously comprising a plurality of colors to create any of a fourth color and a cross pattern.

In processing block 1904, the first laser line projector and the second laser line projector are rotated or swept to create a rotating or sweeping plane of light of the third color on the object. In illustrated processing block 1905, images or indications of spatial intensities of a first laser beam, a second laser beam, and intersection beams are repeatedly captured, and in illustrated processing block 1906, sequential positions of highlights are related to (or are used to create) a 3D representation of an object.

The embodiments herein may be incorporated in various applications. For example, the LADAR apparatus and system may be used for crop, tree and vegetation inspection, for counter-drug interdiction, or for forestry preservation. The system may be applied to spectroscopy as well, especially if a pair of tunable lasers vary the two-color emissions in a manner that sweeps through various third-color wavelengths.

The LADAR system may be applied to the inspection of cargo, and the counting of ships, trains, or other vehicles passing through the third-color plane. For example, cargo trains, or trucks passing through this third-color plane may be captured and imaged in 3D to provide a physical count, a physical measurement of the objects, or dimensions for the classification of vehicle type, and other physical features that may be used for statistics, tagging or alerting. Similarly, the LADAR system may be applied to the inspection of products in a production line, and quality control of products.

The LADAR system may be used in biometric identification system by creating 3D scans of face, body dimensions and gait as subjects pass through a third-color plane in an airport, check-point or other controlled movement area. Fusing this 3D information with simultaneously collected visible color or thermal image of the subject may create realistically colorized or highlighted features on the 3D model of the subjects.

The LADAR system may be applied in collaborative sensing by using a projectile with only the two-color laser-plane illumination features as discussed above and a second remotely operated high-frame-rate and high pixel-count imaging system. The collaborative sensing system may independently observe and illuminate projectiles as the projectiles pass over an area or move toward a target. Ballistic principles may be used to predict the angle and velocity of the projectiles to relate the imaged yellow (third-color) pixels to geo-registered coordinates for creating a 3D map. The motor-driven rotation described previously could be replaced by a projectile's dynamic rotation in flight.

The LADAR system may be applied to tornado, waterspout and hurricane velocity profile, size and shape documentation; and determine moving objects, particles or density fluctuations in the vicinity of a third-color light-plane projected onto, or into, the tornado or hurricane. Movement within the plane of third-color light may indicate velocity and trajectory within the plane by using either the third-color or relative red and green pixel displacements for adjacent imaging frames at a fixed distance and field-of-view. Similarly, smokestack or explosion plumes may be inspected, and indications of gas or particulate concentrations or velocity may be provided.

The LADAR system may be applied shipboard alerting for approaching vehicles. Laser wavelengths that penetrate water easily may be utilized. These methods may also be used under water for diver detection or collision avoidance. The LADAR system may be applied in alert systems that indicate that an aircraft, ship or vehicle has crossed a particular range threshold. Two wavelengths may be out of the visible band, and may combine to form the third-color in the visible domain. The third color may only be visible to a person when the aircraft, ship or vehicle is in the intersecting third-color region.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method comprising:
    projecting a first laser beam of a first color with a first laser line projector;
    projecting a second laser beam of a second color with a second laser line projector;
    adjusting a laser plane of the first laser beam and a laser plane of the second laser beam to create a beam intersection line plane of a third color on an object at a predetermined intersection range from the first laser line projector and the second laser line projector; and
    rotating the first laser line projector and the second laser line projector to create a rotating plane of light of the third color on the object, further comprising detecting the first laser beam, the second laser beam, and the beam intersection line plane of the third color with an image or color capture device, further comprising:
    capturing the first laser beam;
    transmitting the first laser beam to a detection area;
    capturing the second laser beam; and
    transmitting the second laser beam to the detection area.

2. A method comprising:
    projecting a first laser beam of a first color with a first laser line projector;
    projecting a second laser beam of a second color with a second laser line projector;
    adjusting a laser plane of the first laser beam and a laser plane of the second laser beam to create a beam intersection line plane of a third color on an object at a predetermined intersection range from the first laser line projector and the second laser line projector; and
    rotating the first laser line projector and the second laser line projector to create a rotating plane of light of the third color on the object further comprising projecting multiple laser beams simultaneously comprising a plurality of colors to create any of a fourth color and a cross pattern.

3. A system comprising:
    a first laser line projector to project a first laser beam of a first color;
    a second laser line projector to project a second laser beam of a second color;
    a laser source adjuster to adjust a laser plane of the first laser beam and a laser plane of the second laser beam to create a beam intersection line plane of a third color on an object at a predetermined intersection range from the first laser line projector and the second laser line projector;
    an image or color capture device to create a three-dimensional (3D) representation of objects in a field of view of the image or color capture device; and
    a motor to rotate the first laser line projector and the second laser line projector to create a rotating plane of light of the third color on the object, wherein the motor comprises a shaft, and the first laser line projector and the second laser line projector are mounted on a rail that is perpendicular to the shaft.

4. The system of claim 3, wherein the image or color capture device is to detect the first laser beam, the second laser beam, and the beam intersection line plane of the third color.

5. The system of claim 3, comprising:
    a first cylindrical lens to capture the first laser beam and transmit the first laser beam to a detection area; and
    a second cylindrical lens to capture the second laser beam and transmit the second laser beam to the detection area.

6. The system of claim 3, wherein the third color comprises an average of a wavelength of the first color of the first laser beam and a wavelength of the second color of the second laser beam.

7. The system of claim 3, wherein the laser source adjuster adjusts the first laser line projector and the second laser line projector to create the beam intersection line plane of the third color at a distance determined by an angle of the first laser line projector and an angle of the second laser line projector.

8. The system of claim 3, wherein the first color is red, the second color is green, and the third color is yellow.

9. A method for creating a three-dimensional (3D) laser detection and ranging (LADAR) image representation, the method comprising:
    projecting a first laser beam of a first color with a first laser line projector;
    projecting a second laser beam of a second color with a second laser line projector;
    creating a beam intersection light wall of a third color on an object at a predetermined intersection range from the first laser line projector and the second laser line projector;
    determining a relative motion between the light wall of the third color and the object as the object passes through the light wall;
    repeatedly detecting pixel highlights of the third color based on the relative motion between the light wall of the third color and the object; and
    creating the 3D LADAR image representation based on the detected pixel highlights.

10. The method of claim 9, comprising setting the light wall of the third color at a fixed distance from the object.

11. The method of claim 9, comprising capturing an image or color containing the detected pixel highlights.

12. The method of claim 11, wherein each captured image or color comprises an instantaneously detected pixel highlight location for successive image or color captures.

13. The method of claim 12, wherein the successive image or color captures are derived from a movement of either the object or the light wall of the third color.

14. The method of claim 9, wherein the 3D LADAR image representation comprises any of a 3D LADAR image point-cloud and a 3D LADAR image cube.

\* \* \* \* \*